United States Patent
Oh et al.

(10) Patent No.: US 10,547,988 B2
(45) Date of Patent: Jan. 28, 2020

(54) METHOD FOR ACQUIRING INFORMATION ABOUT PEDESTRIAN AND COMMUNICATION DEVICE FOR VEHICLE

(71) Applicant: LG Electronics Inc., Seoul (KR)

(72) Inventors: Kyungtae Oh, Seoul (KR); Suho Park, Seoul (KR); Jeongju Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/856,693

(22) Filed: Dec. 28, 2017

(65) Prior Publication Data

US 2019/0098469 A1  Mar. 28, 2019

(30) Foreign Application Priority Data

Sep. 25, 2017 (KR) .................... 10-2017-0123722

(51) Int. Cl.
*H04W 4/44* (2018.01)
*H04L 29/08* (2006.01)
(Continued)

(52) U.S. Cl.
CPC ............. *H04W 4/44* (2018.02); *B60W 30/08* (2013.01); *H04W 4/025* (2013.01); *H04L 67/12* (2013.01)

(58) Field of Classification Search
CPC .... G05D 1/0094; G05D 1/024; G05D 1/0246; G05D 1/0257; G01S 7/4026; G01S 7/41; G01S 7/4802; G01S 7/4972; G01S 13/865; G01S 13/867; G01S 13/931; G01S 17/023; G01S 17/936; G01S 2007/403; G01S 2013/9375; G01S 2013/9392; H04W 4/04; H04W 4/02; H04W 52/02; G08G 1/09; G08G 1/16
See application file for complete search history.

(56) References Cited

U.S. PATENT DOCUMENTS 8,903,592 B1 * 12/2014 Mariet .................. B60T 7/22
701/28
2006/0063548 A1  3/2006 Kim
(Continued)

FOREIGN PATENT DOCUMENTS

JP  2008-066805  3/2008
JP  2011-253403  12/2011
(Continued)

OTHER PUBLICATIONS

Extended European Search Report in European Application No. 18188935.3, dated Mar. 1, 2019, 9 pages.
(Continued)

*Primary Examiner* — Khawar Iqbal
(74) *Attorney, Agent, or Firm* — Fish & Richardson P.C.

(57) ABSTRACT

A method for acquiring information about a mobile terminal user is disclosed. In particular, the method that includes: receiving, by a receiver, location information about a plurality of mobile terminals, the location information including information for a location of each of the plurality of mobile terminals; and based on the location information, determining, by at least one processor, information about at least one mobile terminal of the plurality of mobile terminals to be included in information about objects, wherein the information about objects is used for travel of a vehicle is disclosed.

18 Claims, 27 Drawing Sheets

(51) Int. Cl.
    *B60W 30/08*   (2012.01)
    *H04W 4/02*    (2018.01)

(56) References Cited

U.S. PATENT DOCUMENTS

| | | | |
|---|---|---|---|
| 2017/0270799 A1* | 9/2017 | Takeda | G08G 1/167 |
| 2018/0061232 A1* | 3/2018 | Madigan | G08G 1/096783 |
| 2018/0072313 A1* | 3/2018 | Stenneth | B60W 30/09 |
| 2018/0139565 A1* | 5/2018 | Norris | H04S 7/304 |
| 2018/0273030 A1* | 9/2018 | Weldon | B60W 30/09 |
| 2018/0297511 A1* | 10/2018 | Park | B60Q 1/1423 |
| 2019/0042865 A1* | 2/2019 | Vallespi-Gonzalez | G06K 9/00369 |
| 2019/0049948 A1* | 2/2019 | Patel | G05D 1/0027 |
| 2019/0051150 A1* | 2/2019 | Anderson | G08G 1/005 |
| 2019/0095514 A1* | 3/2019 | Anastassov | G06F 16/355 |
| 2019/0120634 A1* | 4/2019 | Kasahara | G01S 13/931 |
| 2019/0164422 A1* | 5/2019 | Bai | G08G 1/096783 |
| 2019/0220029 A1* | 7/2019 | Fukuhara | G05D 1/0088 |
| 2019/0225217 A1* | 7/2019 | Tsukada | B60W 30/10 |
| 2019/0236380 A1* | 8/2019 | Fukuhara | G05D 1/0088 |

FOREIGN PATENT DOCUMENTS

| | | |
|---|---|---|
| JP | 2016-067028 | 4/2016 |
| JP | 2016-184200 | 10/2016 |
| WO | WO2016137705 | 9/2016 |

OTHER PUBLICATIONS

Anonymous, "3rd Generation Partnership Project; Technical Specification Group Service and System Aspects; Study on LTE Support for V2X Services (Release 14)," 3GPP TR 22.885 V1.0.0, Sep. 1, 2015, pp. 1-42, XP55382092.

Chika Sugimoto et al, "Prototype of pedestrian-to-vehicle communication system for the prevention of pedestrian accidents using both 3G wireless and WLAN communication," Wireless Pervasive Computing, 2008. ISWPC 2008. 3RD International Symposium on, IEEE, Piscataway, NJ, USA, May 7, 2008, pp. 764-767, XP031281344.

* cited by examiner

METHOD FOR ACQUIRING INFORMATION ABOUT PEDESTRIAN AND COMMUNICATION DEVICE FOR VEHICLE

CROSS-REFERENCE TO RELATED APPLICATION

This application claims the priority benefit of Korean Patent Application No. 10-2017-0123722, filed on Sep. 25, 2017 in the Korean Intellectual Property Office, the disclosure of which is incorporated herein by reference.

TECHNICAL FIELD

The present application relates to technologies about acquiring information about a pedestrian from a mobile terminal of the pedestrian and use the information to control a vehicle.

BACKGROUND

A vehicle is an apparatus that is moved in a desired direction by a user riding therein. A typical example of the vehicle is an automobile.

Vehicles have been increasingly equipped with various sensors and electronic devices to provide user convenience. In particular, research has been actively conducted on an advanced driver assistance system (ADAS) to provide user convenience in driving. Further, autonomous vehicles have been actively developed.

In order to implement an ADAS and an autonomous vehicle, information about pedestrians outside the vehicle must be acquired.

Information about pedestrians may be acquired through V2P (vehicle to pedestrian) communication.

However, if the vehicle receives information about all people located in the vicinity of the vehicle, there is a possibility that a problem will occur in data processing.

SUMMARY

In general, one innovative aspect of the subject matter described in this specification can be implemented in a method for acquiring information about a mobile terminal user, the method comprising: receiving, by a receiver, location information about a plurality of mobile terminals, the location information including information for a location of each of the plurality of mobile terminals; and based on the location information, determining, by at least one processor, information about at least one mobile terminal of the plurality of mobile terminals to be included in information about objects, wherein the information about objects is used for travel of a vehicle.

The foregoing and other implementations can each optionally include one or more of the following features, alone or in combination. In particular, one implementation includes all the following features in combination. The location information comprises: point information about points at which the plurality of mobile terminals are respectively located, and change information about changed points to which the mobile terminals are respectively moved from the points. Determining, by at least one processor, information about a mobile terminal of the plurality of mobile terminals to be included in information about objects comprises: based on the point information, determining, by the at least one processor, whether a first mobile terminal of the plurality of mobile terminals is located inside a building, and based on a determination that the first mobile terminal is located in an interior area of the building, determining, by the at least one processor, information about the first mobile terminal not to be included in the information about objects. Determining, by at least one processor, information about a mobile terminal of the plurality of mobile terminals to be included in information about objects comprises: based on the change information, determining, by the at least one processor, whether the first mobile terminal is moved from the interior area of the building to an exterior area of the building; and based on a determination that the first mobile terminal is being moved from the interior area of the building to the exterior area of the building, determining, by the processor, the information on the first mobile terminal to be included in the information on the objects. Determining, by at least one processor, information about a mobile terminal of the plurality of mobile terminals to be included in information about objects comprises: based on the point information, determining, by the at least one processor, whether a second mobile terminal of the plurality of mobile terminals is located in a first area of a sidewalk, the first area being spaced from a roadway by at least a reference distance, and based on a determination that the second mobile terminal is located in the first area, determining, by the at least one processor, information on the second mobile terminal not to be included in the information about objects. Determining, by at least one processor, information about a mobile terminal of the plurality of mobile terminals to be included in information about objects comprises: based on the change information, determining, by the at least one processor, whether the second mobile terminal is being moved from the first area to a second area, the second area being within the reference distance from the roadway, and based on a determination that the second terminal is being moved from the first area to the second area, determining, by the at least one processor, the information about the second mobile terminal to be included in the information about objects. Determining, by at least one processor, information on a mobile terminal of the plurality of mobile terminals to be included in information on objects comprises: based on the point information, determining, by the at least on processor, whether a third mobile terminal of the plurality of mobile terminals is located in an interior area of a first vehicle; and based on a determination that the third mobile terminal is located in the interior area of the first vehicle, determining, by the at least one processor, information about the third mobile terminal not to be included in the information about objects. Determining, by at least one processor, information on a mobile terminal of the plurality of mobile terminals to be included in information on objects comprises: based on the change information, determining, by the at least one processor, whether the third mobile terminal is being moved from the interior area of the first vehicle to an exterior area of the first vehicle, and based on a determination that the third mobile terminal is being moved from the interior area of the third mobile terminal to the exterior area of the first vehicle, determining, by the at least one processor, the information about the third mobile terminal to be included in the information about objects. Determining, by at least one processor, information on a mobile terminal of the plurality of mobile terminals to be included in information on objects comprises: based on the point information, determining, by the at least one processor, whether a fourth mobile terminal of the plurality of mobile terminals is located in a rearward direction relative to the vehicle, and based on a determination that the fourth mobile terminal is located at the rearward direction relative to the vehicle, determining, by the at least one processor, information about the fourth mobile terminal not to be included in the information about objects. Determining, by at least one processor, information on a mobile terminal of the plurality of mobile terminals to be included in information on objects comprises: based on the point information, determining, by the at least one processor, whether a fifth mobile terminal of the plurality of mobile terminals is located in a caution area, and based on a determination that the fifth mobile terminal is located in the caution area, determining, by the at least one processor, information about the fifth mobile terminal to be included in the information about objects, and wherein the caution area comprises a bus stop area, a parking area, and an area in which more than a reference number of mobile terminals of the plurality of mobile terminals are located. The location information comprises: altitude information for each of the plurality of mobile terminals, wherein determining, by at least one processor, information on a mobile terminal of the plurality of mobile terminals to be included in information on objects comprises: based on the altitude information for a sixth mobile terminal of the plurality of mobile terminals, determining, by the at least one processor, whether a difference of altitude between the sixth mobile terminal and the vehicle satisfies a reference value, and based on a determination that the difference of altitude between the sixth mobile terminal and the vehicle satisfies the reference value, determining, by the at least one processor, information about the sixth mobile terminal not to be included in the information about objects. The method further includes: based on the location information, classifying, by the at least one processor, the plurality of mobile terminals into one or more groups, wherein determining, by at least one processor, information on a mobile terminal of the plurality of mobile terminals to be included in information on objects comprises: based on information about the one or more groups, determining, by the at least one processor, information about a mobile terminal of the plurality of mobile terminals to be included in the information about objects. Classifying, by the at least one processor, the plurality of mobile terminals into one or more groups comprises: based on the location information, determining, by the at least one processor, whether at least one mobile terminal of the plurality of mobile terminals is located in an interior area of a building, and based on a determination that the at least one mobile terminal is located in the interior area of the building, classifying, by the at least one processor, the at least one mobile terminal into a first group of the one or more groups, and wherein determining, by at least one processor, information about a mobile terminal of the plurality of mobile terminals to be included in information about objects comprises: determining, by the at least one processor, information about the at least one terminal in the first group not to be included in the information about objects. Classifying, by the at least one processor, the plurality of mobile terminals into one or more groups comprises: based on the location information, determining, by the at least one processor, whether at least one mobile terminal of the plurality of mobile terminals is located in a first area of a sidewalk, the first area being spaced from a roadway by at least a reference distance, and based on a determination that the at least one mobile terminal is located in the first area of the sidewalk, classifying, by the at least one processor, the at least one mobile terminal into a second group of the one or more groups, wherein determining, by at least one processor, information about a mobile terminal of the plurality of mobile terminals to be included in information about objects comprises: determining, by the at least one processor, information about the at least one terminal in the second group not to be included in the information about objects. Classifying, by the at least one processor, the plurality of mobile terminals into one or more groups comprises: based on the location information, determining, by the at least one processor, whether at least one mobile terminal of the plurality of mobile terminals is located in an interior area of a second vehicle that is different from the vehicle, based on a determination that the at least one mobile terminal is located in the interior area of the second vehicle, classifying, by the at least one processor, the at least one mobile terminal into a third group of the one or more groups, and wherein determining, by at least one processor, information about a mobile terminal of the plurality of mobile terminals to be included in information about objects comprises: determining, by the at least one processor, information about the at least one terminal in the third group not to be included in the information about objects. The method further includes: based on a determination that the at least one mobile terminal of the plurality of mobile terminals is located in the interior area of the second vehicle, determining, by the at least one processor, information about the at least one mobile terminal in the third group to be included in information about the second vehicle. The method further includes: based on the location information, determining, by the at least one processor, whether the at least one mobile terminal in the third group is being moved from the interior area of the second vehicle to an exterior area of the second vehicle; and based on a determination that the at least one mobile terminal in the third group is being moved from the interior area of the second vehicle to the exterior area of the second vehicle, removing the information about the at least one mobile terminal in the third group from the information about the second vehicle. Classifying, by the at least one processor, the plurality of mobile terminals into one or more groups comprises: based on the location information, determining, by the at least one processor, whether a difference of an altitude at which at least one mobile terminal of the plurality of mobile terminals is located and an altitude at which the vehicle is located satisfies a reference value, and based on a determination that the difference satisfies the reference value, classifying, by the at least one processor, the at least one mobile terminal into a fourth group, wherein determining, by at least one processor, information about a mobile terminal of the plurality of mobile terminals to be included in information about objects comprises: determining, by the at least one processor, information about the at least one terminal in the fourth group not to be included in the information about objects. The method further includes: controlling, by the at least one processor through a user interface device, to display a graphical object corresponding to the information that is determined to be included in the information about objects. Controlling to display the graphical object comprises: based on at least one of (i) a distance between the vehicle and the mobile terminal or (ii) driving lane information, determining, by the at least one processor, at least one of a shape, a size, a color, or transparency of the graphical object.

The subject matter described in this specification can be implemented in particular examples so as to realize one or more of the following advantages. The method described in this specification acquires information from a mobile terminal of a pedestrian and use the information for control a vehicle. In particular, the method determines necessary information for controlling a vehicle based on a location of the mobile device. As a result, the method can only use meaningful and necessary information to control a vehicle, reducing computing power of the vehicle. In addition, the method enables safe and efficient driving for the vehicle using the information acquired from the mobile device of the pedestrian.

The details of one or more examples of the subject matter described in this specification are set forth in the accompanying drawings and the description below. Other potential features, aspects, and advantages of the subject matter will become apparent from the description, the drawings, and the claim.

DETAILED DESCRIPTION

Reference will now be made in detail to implementations, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing implementations disclosed in this specification, a detailed description of relevant well-known technologies may not be given in order not to obscure the subject matter of the present application. In addition, the accompanying drawings are merely intended to facilitate understanding of the implementations disclosed in this specification and not to restrict the technical spirit of the present application. In addition, the accompanying drawings should be understood as covering all equivalents or substitutions within the scope of the present application.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" are intended to include the plural forms as well, unless context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The term "vehicle" employed in this specification may include an automobile and a motorcycle. Hereinafter, description will be given mainly focusing on an automobile.

The vehicle described in this specification may include a vehicle equipped with an internal combustion engine as a power source, a hybrid vehicle equipped with both an engine and an electric motor as a power source, and an electric vehicle equipped with an electric motor as a power source.

In the description below, the left side of the vehicle means the left side with respect to the travel direction of the vehicle and the right side of the vehicle means the right side with respect to the travel direction of the vehicle.

Figure 1:
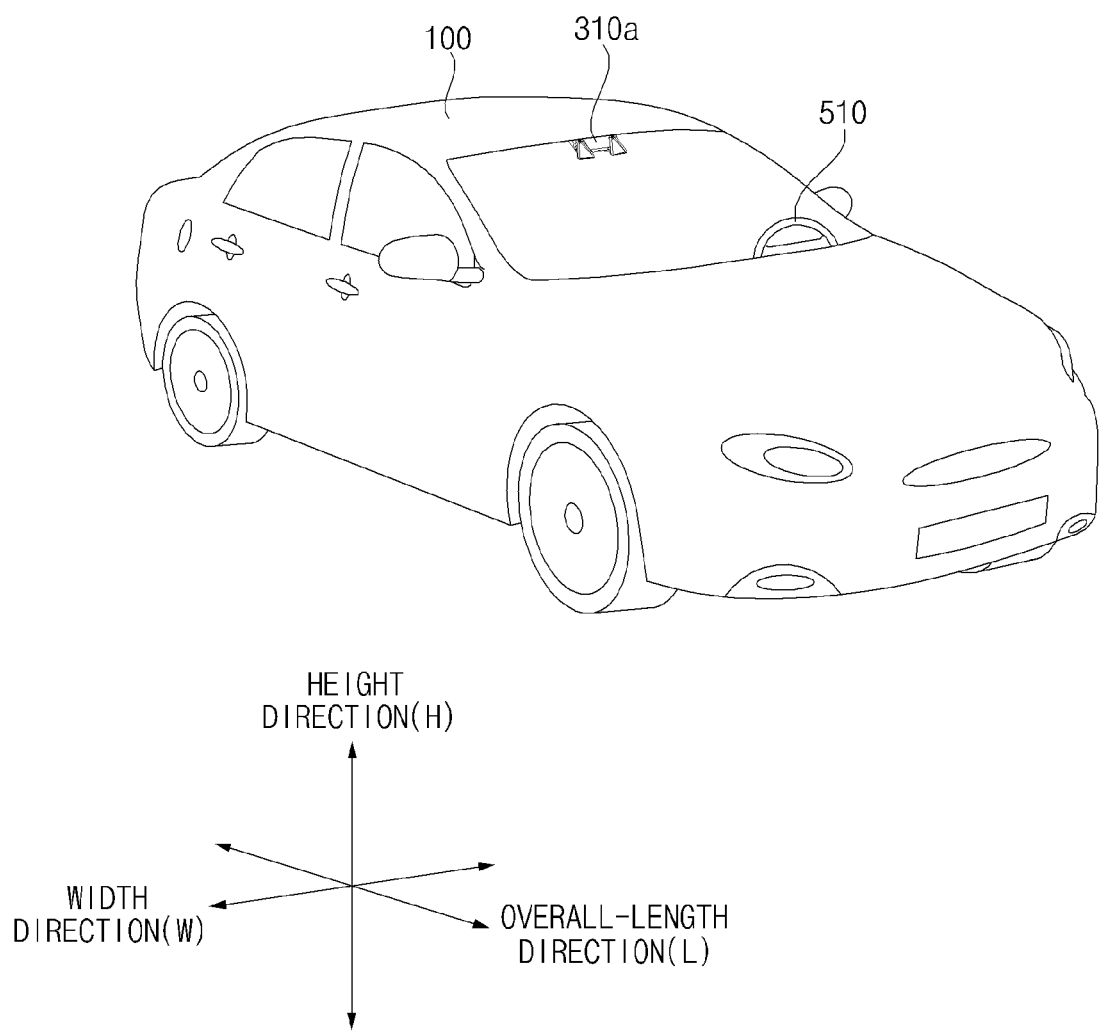
FIG. 1 is a diagram illustrating an example exterior of a vehicle.
Figure 2:
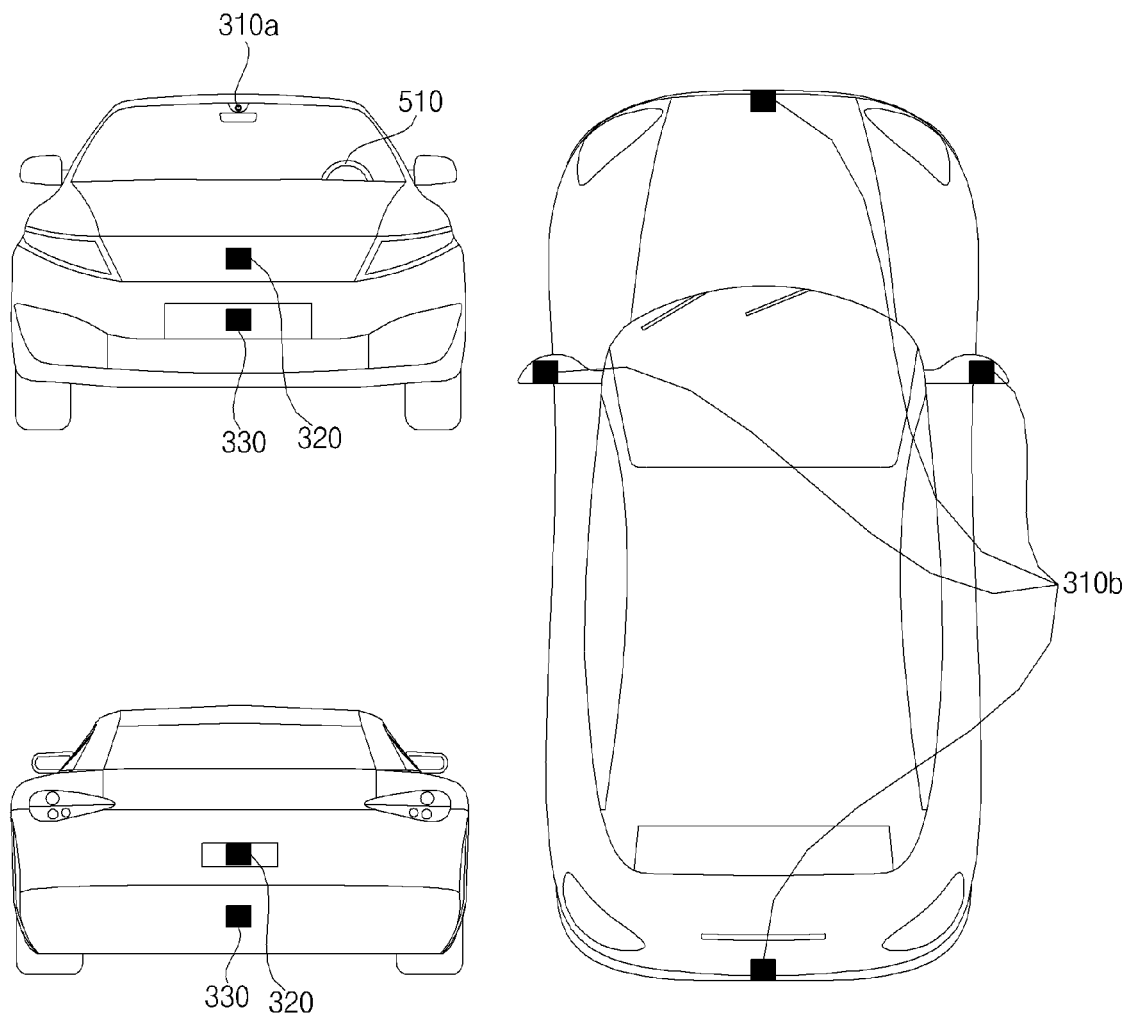
FIG. 2 is a diagram illustrating example exteriors of a vehicle in various angles.
Figure 3:
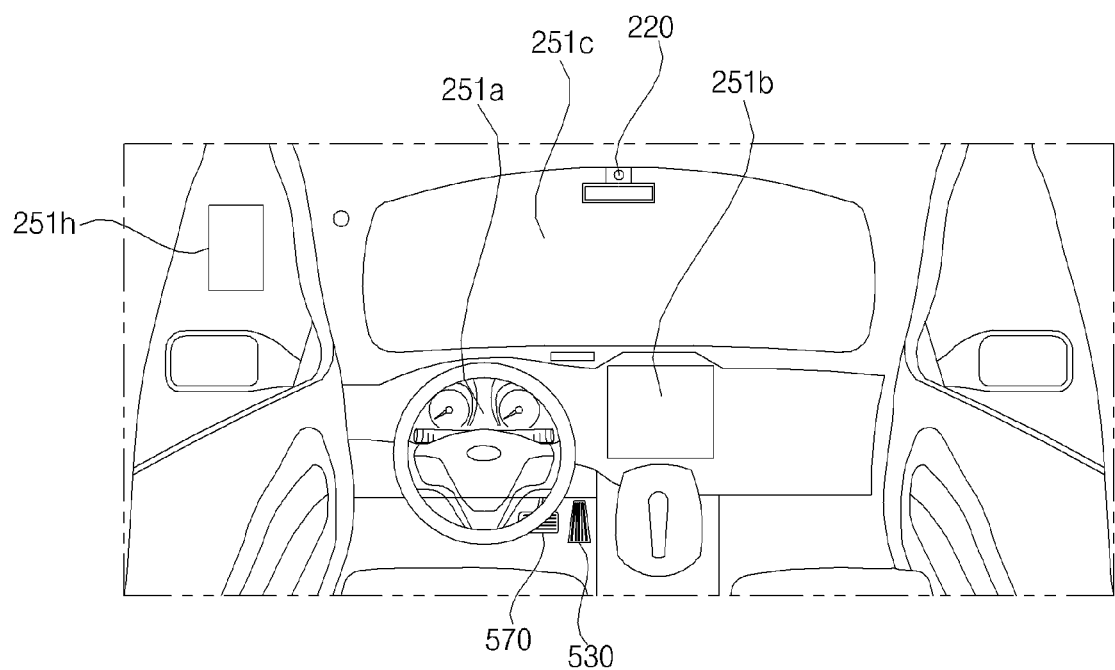
FIGS. 3 and 4 are diagrams illustrating an example interior of a vehicle.
Figure 4:
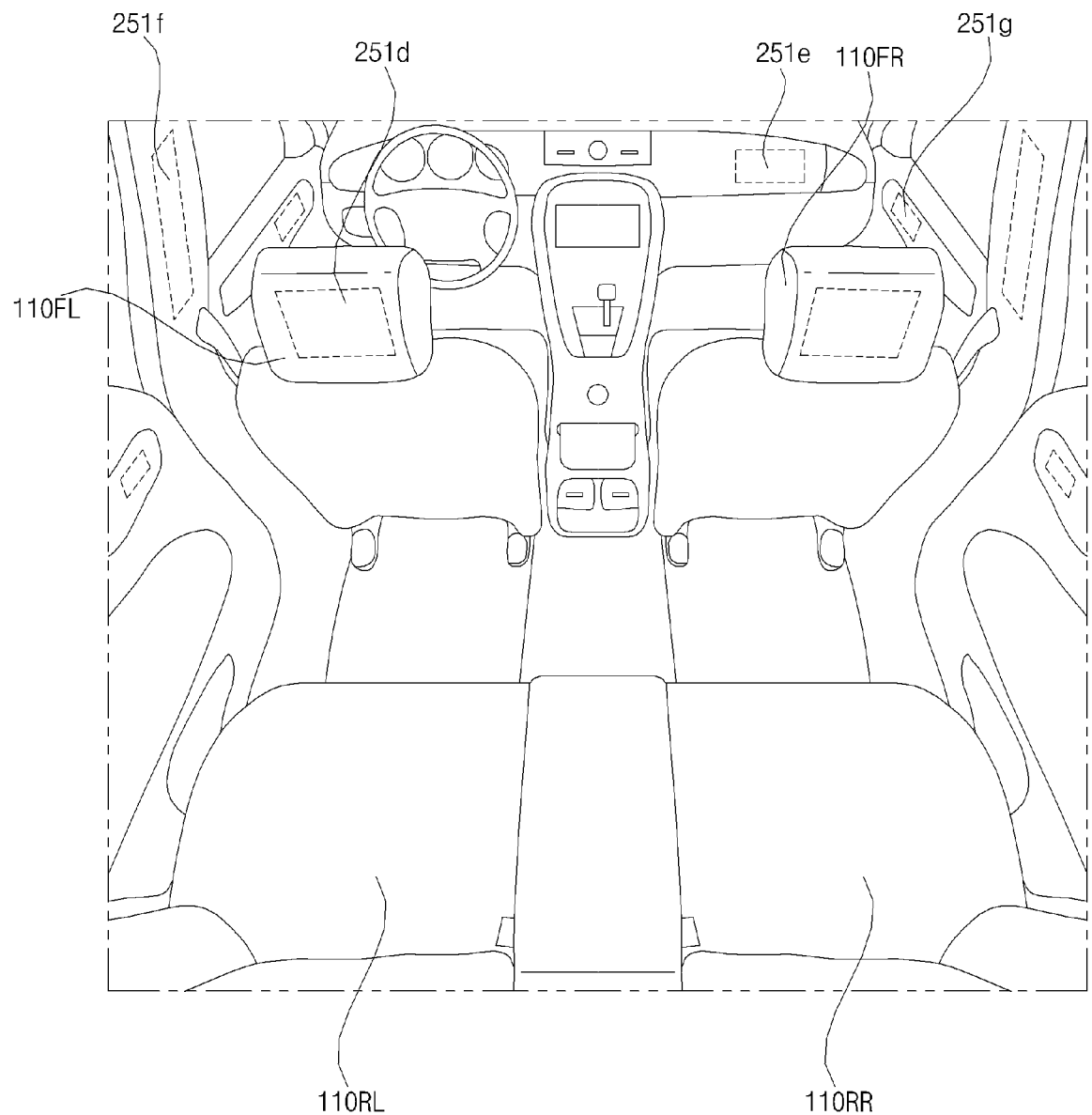
Figure 5:
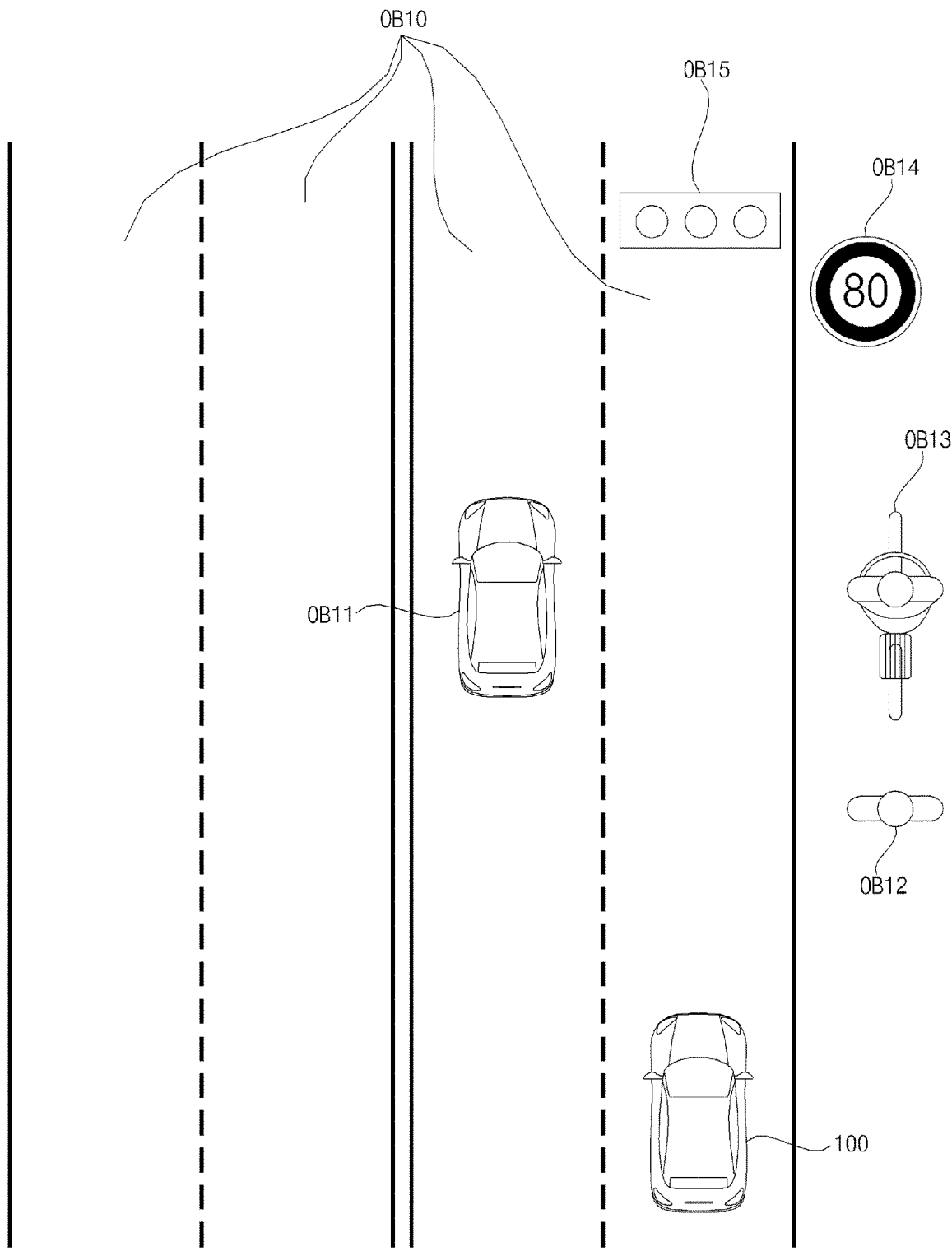
FIGS. 5 and 6 are diagrams illustrating example objects.
Figure 6:
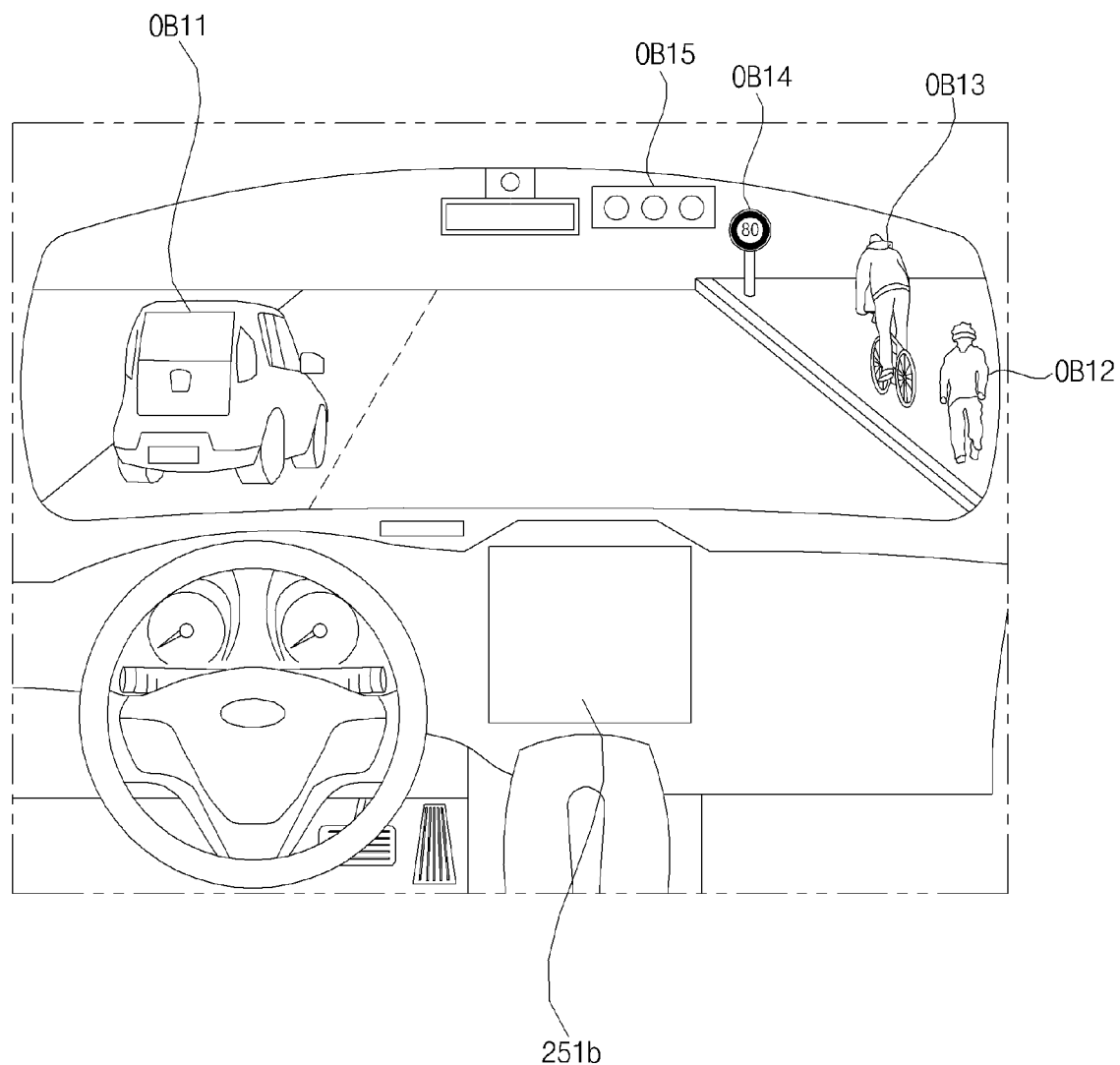
Figure 7:
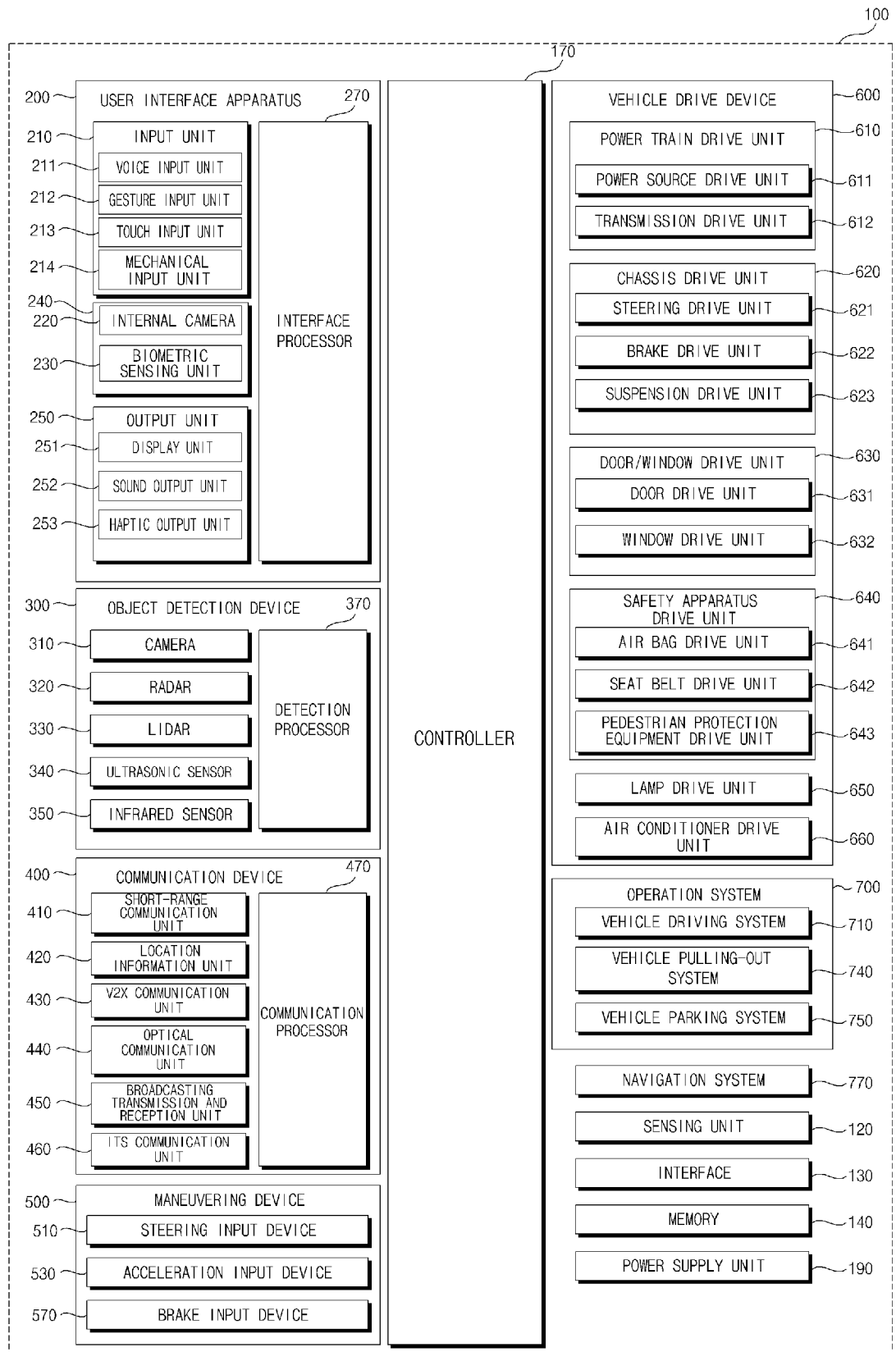
FIG. 7 is a diagram illustrating an example vehicle.

FIG. 1 illustrates an example exterior of a vehicle. FIG. 2 illustrates example exteriors of a vehicle in various angles. FIGS. 3 and 4 illustrate an example interior of a vehicle. FIGS. 5 and 6 illustrate example objects. FIG. 7 illustrates an example vehicle.

Referring to FIGS. 1 to 7, a vehicle 100 may include wheels rotated by a power source, and a steering input device 510 for controlling a travel direction of the vehicle 100.

The vehicle 100 may be an autonomous vehicle.

The vehicle 100 may switch to an autonomous driving mode or a manual mode according to a user input.

For example, the vehicle 100 may switch from the manual mode to the autonomous driving mode or from the autonomous driving mode to the manual mode, based on a user input received through a User Interface (UI) device 200.

The vehicle 100 may switch to the autonomous driving mode or the manual mode based on driving situation information.

The driving situation information may include at least one of information about objects outside the vehicle, navigation information, or vehicle state information.

For example, the vehicle 100 may switch from the manual mode to the autonomous driving mode or from the autonomous driving mode to the manual mode, based on the driving situation information generated from an object detection device 300.

For example, the vehicle 100 may switch from the manual mode to the autonomous driving mode or from the autonomous driving mode to the manual mode, based on the driving situation information received from a communication device 400.

The vehicle 100 may switch from the manual mode to the autonomous driving mode or from the autonomous driving mode to the manual mode, based on information, data, or a signal provided by an external device.

If the vehicle 100 travels in the autonomous driving mode, the autonomous vehicle 100 may be operated based on an operation system 700.

For example, the autonomous vehicle 100 may travel based on information, data, or signals generated from a driving system 710, a park-out system 740, and a park-in system.

If the vehicle 100 travels in the manual mode, the autonomous vehicle 100 may receive a user input for driving through a driving manipulation device 500. The vehicle 100 may be operated based on the user input received through the driving manipulation device 500.

The overall length refers to the length of the vehicle 100 from the front to back of the vehicle 100, the width refers to the width of the vehicle 100, and the height refers to the distance from the bottom of wheels to the roof of the vehicle. In the description below, the overall-length direction L may indicate a direction in which measurement of overall length of the vehicle 100 is performed, the width direction W may indicate a direction in which measurement of width of the vehicle 100 is performed, and the height direction H may indicate a direction in which measurement of height of the vehicle 100 is performed.

As illustrated in FIG. 7, the vehicle 100 may include the UI device 200, the object detection device 300, the communication device 400, the driving manipulation device 500, a vehicle driving device 600, the operation system 700, a navigation system 770, a sensing unit 120, an interface unit 130, a memory 140, a controller 170, and a power supply 190.

In some implementations, the vehicle 100 may further include a new component in addition to the components described in the present application, or may not include a part of the described components.

The UI device 200 is used to enable the vehicle 100 to communicate with a user. The UI device 200 may receive a user input, and provide information generated from the vehicle 100 to the user. The vehicle 100 may implement UIs or User Experience (UX) through the UI device 200.

The UI device 200 may include an input unit 210, an internal camera 220, a biometric sensing unit 230, an output unit 250, and a processor 270.

In some implementations, the UI device 200 may further include a new component in addition to components described below, or may not include a part of the described components.

The input unit 210 is intended to receive information from a user. Data collected by the input unit 210 may be analyzed by the processor 270 and processed by a control command from the user.

The input unit 210 may be disposed inside the vehicle 100. For example, the input unit 210 may be disposed in an area of a steering wheel, an area of an instrument panel, an area of a seat, an area of a pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an infrared (IR) sensor and an image sensor, for sensing a gesture input of the user.

In some implementations, the gesture input unit 212 may sense a three-dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert a touch input of the user to an electrical signal. The electrical signal may be provided to the processor 270 or the controller 170.

The touch input unit 213 may include a touch sensor for sensing a touch input of the user.

In some implementations, a touch screen may be configured by integrating the touch input unit 213 with a display unit 251. The touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, the center fascia, the center console, the cockpit module, a door, or the like.

The internal camera 220 may acquire a vehicle interior image. The processor 270 may sense a state of a user based on the vehicle interior image. The processor 270 may acquire information about the gaze of a user in the vehicle interior image. The processor 270 may sense the user's gesture in the vehicle interior image.

The biometric sensing unit 230 may acquire biometric information about a user. The biometric sensing unit 230 may include a sensor for acquiring biometric information about a user, and acquire information about a fingerprint, heart beats, and the like of the user, using the sensor. The biometric information may be used for user authentication.

The output unit 250 is provided to generate a visual output, an acoustic output, or a haptic output.

The output unit 250 may include at least one of the display unit 251, an audio output unit 252, or a haptic output unit 253.

The display unit 251 may display graphical objects corresponding to various kinds of information.

The display unit 251 may include at least one of a liquid crystal display (LCD), a thin film transistor-liquid crystal display (TFT LCD), an organic light-emitting diode (OLED) display, a flexible display, a 3D display, or an e-ink display.

The display unit 251 may form a layered structure together with the touch input unit 213 or be integrated with the touch input unit 213, thereby implementing a touch-screen.

The display unit 251 may be implemented as a head up display (HUD). In this case, the display unit 251 may be provided with a projection module, and output information by an image projected onto the windshield or a window.

The display unit 251 may include a transparent display. The transparent display may be attached to the windshield or a window.

The transparent display may display a specific screen with a specific transparency. To have a transparency, the transparent display may include at least one of a transparent Thin Film Electroluminescent (TFEL) display, a transparent OLED display, a transparent LCD, a transmissive transparent display, or a transparent LED display. The transparency of the transparent display is adjustable.

The UI device 200 may include a plurality of display units 251a to 251g.

The display unit 251 may be disposed in an area of the steering wheel, an area 251a, 251b, 251e of the instrument panel, an area 251d of a seat, an area 251f of a pillar, an area 251g of a door, an area of the center console, an area of a head lining, or an area of a sun visor, or may be implemented in an area 251c of the windshield, and an area 251h of a window.

The audio output unit 252 converts an electrical signal received from the processor 270 or the controller 170 to an audio signal, and outputs the audio signal. To this end, the audio output unit 252 may include one or more speakers.

The haptic output unit 253 generates a haptic output. For example, the haptic output unit 253 may vibrate the steering wheel, a seat belt, a seat 110FL, 110FR, 110RL, or 110RR, such that a user may perceive the output.

The processor 270 may control overall operation of the respective units of the UI device 200.

In some implementations, the UI device 200 may include a plurality of processors 270 or no processor 270.

If the UI device 200 does not include any processor 270, the UI device 200 may operate under control of a processor of another device in the vehicle 100, or under control of the controller 170.

The UI device 200 may be referred to as a vehicle display device.

The UI device 200 may operate under control of the controller 170.

The object detection device 300 is used to detect an object outside the vehicle 100. The object detection device 300 may generate object information based on sensing data.

The object information may include information indicating presence or absence of an object, information about the location of an object, information indicating the distance between the vehicle 100 and the object, and information about a relative speed of the vehicle 100 with respect to the object.

The object may be any of various objects related to driving of the vehicle 100.

Referring to FIGS. 5 and 6, the object O may include a lane OB10, another vehicle OB11, a pedestrian OB12, a two-wheeled vehicle OB13, a traffic signal OB14 and OB15, light, a road, a structure, a speed bump, a geographical feature, and an animal.

The lane OB10 may include a driving lane, a lane next to the driving lane, and a lane in which a vehicle is driving in the opposite direction. The lane OB10 may conceptually include left and right lines that define each of the lanes. The lane may conceptually include an intersection.

The other vehicle OB11 may be a vehicle traveling in the vicinity of the vehicle 100. The other vehicle OB11 may be located inside a predetermined distance from the vehicle 100. For example, the other vehicle OB11 may precede or follow the vehicle 100.

The pedestrian OB12 may be a person located around the vehicle 100. The pedestrian OB12 may be a person located inside a predetermined distance from the vehicle 100. For example, the pedestrian OB12 may be a person on a sidewalk or a roadway.

The two-wheeled vehicle OB13 may refer to a transportation devices moving on two wheels, located around the vehicle 100. The two-wheeled vehicle OB13 may be a transportation devices having two wheels, located inside a predetermined distance from the vehicle 100. For example, the two-wheeled vehicle OB13 may be a motorcycle or bicycle on a sidewalk or a roadway.

The traffic signal may include a traffic light OB15, a traffic sign OB14, and a symbol or text drawn or written on a road surface.

The light may be light generated from a lamp of another vehicle. The light may be generated from a street lamp. The light may be sunlight.

The road may include a road surface, a curve, and a slope such as an uphill or downhill road.

The structure may be an object located near a road and fixed on the ground. For example, the structure may be any of a street lamp, a street tree, a building, a utility pole, a signal lamp, a bridge, a kerb, and a wall.

The geographical feature may include a mountain and a hill.

Objects may be classified into mobile objects and stationary objects. For example, the mobile objects may conceptually include another vehicle and a pedestrian. For example, the stationary objects may conceptually include a traffic signal, a road, a structure, another stationary vehicle, and a stationary pedestrian.

The object detection device 300 may include a camera 310, a Radio Detection and Ranging (RADAR) 320, a Light Detection and Ranging (LiDAR) 330, an ultrasonic sensor 340, an IR sensor 350, and a processor 370.

In some implementations, the object detection device 300 may further include a new component in addition to components described below or may not include a part of the described components.

To acquire a vehicle exterior image, the camera 310 may be disposed at an appropriate position on the exterior of the vehicle 100. The camera 310 may be a mono camera, a stereo camera 310a, Around View Monitoring (AVM) cameras 310b, or a 360-degree camera.

The camera 310 may acquire information about the location of an object, information about a distance to the object, or information about a relative speed with respect to the object, using various image processing algorithms.

For example, the camera 310 may acquire information about a distance to an object and information about a relative speed with respect to the object in an acquired image, based on a variation in size of the object over time.

For example, the camera 310 may acquire information about a distance to an object and information about a relative speed with respect to the object through a pin hole model, road surface profiling, or the like.

For example, the camera 310 may acquire information about a distance to an object and information about a relative speed with respect to the object based on disparity information in a stereo image acquired by the stereo camera 310a.

For example, to acquire an image of the front view of the vehicle 100, the camera 310 may be disposed in the vicinity of a front windshield inside the vehicle 100. Alternatively, the camera 310 may be disposed around a front bumper or a radiator grille.

For example, to acquire an image of what lies behind the vehicle 100, the camera 310 may be disposed in the vicinity of a rear glass inside the vehicle 100. Or the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Alternatively, the camera 310 may be disposed around a side view mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100 in order to sense an object ahead of, behind, or on a side of the vehicle 100.

The LiDAR 330 may include a laser transmitter and a laser receiver. The LiDAR 330 may be implemented in TOF or phase shifting.

The LiDAR 330 may be implemented in a driven or non-driven manner.

If the LiDAR 330 is implemented in the driven manner, the LiDAR 330 may be rotated by a motor and detect objects around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or on a side of the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100 in order to sense an object ahead of, behind, or on a side of the vehicle 100.

The IR sensor 350 may include an IR transmitter and an IR receiver. The IR sensor 350 may detect an object by IR light, and determine the location, distance, and relative speed of the detected object.

The IR sensor 350 may be disposed at an appropriate position on the exterior of the vehicle 100 in order to sense an object ahead of, behind, or on a side of the vehicle 100.

The processor 370 may provide overall control to each unit of the object detection device 300.

The processor 370 may detect or classify an object by comparing data sensed by the camera 310, the RADAR 320, the LiDAR 330, the ultrasonic sensor 340, and the IR sensor 350 with pre-stored data.

The processor 370 may detect an object and track the detected object, based on an acquired image. The processor 370 may calculate a distance to the object, a relative speed with respect to the object, and so on by an image processing algorithm.

For example, the processor 370 may acquire information about a distance to an object and information about a relative speed with respect to the object from an acquired image, based on a variation in size of the object over time.

For example, the processor 370 may acquire information about a distance to an object and information about a relative speed with respect to the object from an image acquired from the stereo camera 310a.

For example, the processor 370 may acquire information about a distance to an object and information about a relative speed with respect to the object from an image acquired from the stereo camera 310a, based on disparity information.

The processor 370 may detect an object and track the detected object based on electromagnetic waves which are transmitted, are reflected from an object, and then return. The processor 370 may calculate a distance to the object and a relative speed with respect to the object, based on the electromagnetic waves.

The processor 370 may detect an object and track the detected object based on laser light which is transmitted, is reflected from an object, and then returns. The sensing processor 370 may calculate a distance to the object and a relative speed with respect to the object, based on the laser light.

The processor 370 may detect an object and track the detected object based on ultrasonic waves which are transmitted, are reflected from an object, and then return. The processor 370 may calculate a distance to the object and a relative speed with respect to the object, based on the ultrasonic waves.

The processor 370 may detect an object and track the detected object based on IR light which is transmitted, is reflected from an object, and then returns. The processor 370 may calculate a distance to the object and a relative speed with respect to the object, based on the IR light.

In some implementations, the object detection device 300 may include a plurality of processors 370 or no processor 370. For example, the camera 310, the RADAR 320, the LiDAR 330, the ultrasonic sensor 340, and the IR sensor 350 may include individual processors.

If the object detection device 300 includes no processor 370, the object detection device 300 may operate under control of a processor of a device in the vehicle 100 or under control of the controller 170.

The object detection device 300 may operate under control of the controller 170.

The communication device 400 is used to communicate with an external device. The external device may be another vehicle, a mobile terminal, or a server.

The communication device 400 may include at least one of a transmit antenna and a receive antenna, for communication, and a Radio Frequency (RF) circuit and device, for implementing various communication protocols.

The communication device 400 may include a short-range communication unit 410, a location information unit 420, a vehicle-to-everything (V2X) communication unit 430, an optical communication unit 440, a broadcasting transceiver unit 450, an intelligent transport system (ITS) communication unit 460, and a processor 470.

In some implementations, the communication device 400 may further include a new component in addition to components described below, or may not include a part of the described components.

The short-range communication module 410 is a unit for conducting short-range communication. The short-range communication module 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include at least one of a GPS module or a Differential Global Positioning System (DGPS) module.

The V2X communication unit 430 is a unit used for wireless communication with a server (by vehicle-to-infrastructure (V2I)), another vehicle (by vehicle-to-vehicle (V2V)), or a pedestrian (by vehicle-to-pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

In some implementations, the optical transmitter may be integrated with a lamp included in the vehicle 100.

The broadcasting transceiver unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may control overall operation of the respective units of the communication device 400.

In some implementations, the communication device 400 may include a plurality of processors 470 or no processor 470.

If the communication device 400 does not include any processor 470, the communication device 400 may operate under control of a processor of another device in the vehicle 100 or under control of the controller 170.

The communication device 400 may be configured along with the UI device 200, as a vehicle multimedia device. In this case, the vehicle multimedia device may be referred to as a telematics device or an Audio Video Navigation (AVN) device.

The communication device 400 may operate under control of the controller 170.

The driving manipulation device 500 is used to receive a user command for driving the vehicle 100.

In the manual mode, the vehicle 100 may travel based on a signal provided by the driving manipulation device 500.

The driving manipulation device 500 may include the steering input device 510, an acceleration input device 530, and a brake input device 570.

The steering input device 510 may receive a travel direction input for the vehicle 100 from a user. The steering input device 510 preferably takes the form of a wheel to rotate to provide a steering input. According to an implementation, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 are preferably formed into pedals. In some implementations, the acceleration input device 530 or the brake input device 570 may be configured as a touch screen, a touchpad, or a button.

The driving manipulation device 500 may operate under control of the controller 170.

The vehicle driving device 600 is used to electrically control operations of various devices of the vehicle 100.

The vehicle driving device 600 may include at least one of a power train drive unit 610, a chassis drive unit 620, a door/window drive unit 630, a safety apparatus drive unit 640, a lamp drive unit 650, and an air conditioner drive unit 660.

In some implementations, the vehicle driving device 600 may further include a new component in addition to components described below or may not include a part of the components.

The vehicle driving device 600 may include a processor. Each the units of the vehicle driving device 600 may individually include a processor.

The power train drive unit 610 may control operation of a power train device.

The power train drive unit 610 may include a power source drive unit 611 and a transmission drive unit 612.

The power source drive unit 611 may control a power source of the vehicle 100.

For example, if the power source is a fossil fuel-based engine, the power source drive unit 611 may perform electronic control on the engine. Therefore, the power source driver 610 may control an output torque of the engine, and the like. The power source drive unit 611 may adjust the engine output torque under control of the controller 170.

For example, if the power source is an electrical energy-based motor, the power source driver 611 may control the motor. The power source driver 611 may adjust a rotation speed, torque, and the like of the motor under control of the controller 170.

The transmission drive unit 612 may control the transmission.

The transmission drive unit 612 may adjust the state of the transmission. The transmission drive unit 612 may adjust the state of the transmission to drive D, reverse R, neutral N, or park P.

If the power source is the engine, the transmission drive unit 612 may adjust the engagement state of gears in the drive mode D.

The chassis drive unit 620 may control operation of a chassis device.

The chassis drive unit 620 may include a steering drive unit 621, a brake drive unit 622, and a suspension drive unit 623.

The steering drive unit 621 may perform electronic control on a steering apparatus in the vehicle 100. The steering drive unit 621 may change the travel direction of the vehicle 100.

The brake drive unit 622 may perform electronic control on a brake apparatus in the vehicle 100. For example, the brake drive unit 622 may decrease the speed of the vehicle 100 by controlling the operation of brakes disposed at wheels.

The brake drive unit 622 may control a plurality of brakes individually. The brake drive unit 622 may control braking power applied to a plurality of wheels differently.

The suspension drive unit 623 may perform electronic control on a suspension apparatus in the vehicle 100. For example, if the surface of a road is rugged, the suspension drive unit 623 may control the suspension apparatus to attenuate vibration of the vehicle 100.

The suspension drive unit 623 may control a plurality of suspensions individually.

The door/window drive unit 630 may perform electronic control on a door apparatus or a window apparatus in the vehicle 100.

The door/window drive unit 630 may include a door drive unit 631 and a window drive unit 632.

The door drive unit 631 may perform electronic control on a door apparatus in the vehicle 100. For example, the door drive unit 631 may control opening and closing of a plurality of doors in the vehicle 100. The door drive unit 631 may control opening or closing of the trunk or the tail gate. The door drive unit 631 may control opening or closing of the sunroof.

The window drive unit 632 may perform electronic control on a window apparatus in the vehicle 100. The window drive unit 632 may control opening or closing of a plurality of windows in the vehicle 100.

The safety apparatus drive unit 640 may perform electronic control on various safety apparatuses in the vehicle 100.

The safety apparatus drive unit 640 may include an airbag drive unit 641, a seatbelt drive unit 642, and a pedestrian protection device drive unit 643.

The airbag drive unit 641 may perform electronic control on an airbag apparatus in the vehicle 100. For example, the airbag drive unit 641 may control inflation of an airbag, upon sensing an emergency situation.

The seatbelt drive unit 642 may perform electronic control on a seatbelt apparatus in the vehicle 100. For example, the seatbelt drive unit 642 may control securing of passengers on the seats 110FL, 110FR, 110RL, and 110RR using seatbelts, upon sensing a danger.

The pedestrian protection device drive unit 643 may perform electronic control on a hood lift and a pedestrian airbag. For example, the pedestrian protection device drive unit 643 may control the hood to be lifted up and the pedestrian airbag to be inflated, upon sensing collision with a pedestrian.

The lamp drive unit 650 may perform electronic control on various lamp apparatuses in the vehicle 100.

The air conditioner drive unit 660 may perform electronic control on an air conditioner in the vehicle 100. For example, if a vehicle internal temperature is high, the air conditioner drive unit 660 may control the air conditioner to operate and supply cool air into the vehicle 100.

The vehicle driving device 600 may include a processor. Each of the units of the vehicle driving device 600 may individually include a processor.

The vehicle driving device 600 may operate under control of the controller 170.

The operation system 700 is a system that controls various operations of the vehicle 100. The operation system 700 may operate in the autonomous driving mode.

The operation system 700 may include the driving system 710, the park-out system 740, and the park-in system 750.

In some implementations, the operation system 700 may further include a new component in addition to the components described below or may not include a part of the described components.

The operation system 700 may include a processor. Each of the units of the operation system 700 may individually include a processor.

In some implementations, if the operation system 700 is implemented in software, the operation system 700 may lie under controller 170 in concept.

In some implementations, the operation system 700 may conceptually include at least one of the UI device 200, the object detection device 300, the communication device 400, the driving manipulation device 500, the vehicle driving device 600, the navigation system 770, the sensing unit 120, or the controller 170.

The driving system 710 may drive the vehicle 100.

The driving system 710 may drive the vehicle 100 by providing a control signal to the vehicle driving device 600 according to navigation information received from the navigation system 770.

The driving system 710 may drive the vehicle 100 by providing a control signal to the vehicle driving device 600 based on object information received from the object detection device 300.

The driving system 710 may drive the vehicle 100 by receiving a signal from an external device through the communication device 400 and providing a control signal to the vehicle driving device 600.

Conceptually, the driving system 710 may be a system that includes at least one of the UI device 200, the object detection device 300, the communication device 400, the driving manipulation device 500, the vehicle driving device 600, the navigation system 770, the sensing unit 120, or the controller 170, and drives the vehicle 100.

The driving system 710 may be referred to as a vehicle travel control device.

The park-out system 740 may perform park-out of the vehicle 100.

The park-out system 740 may perform park-out of the vehicle 100 by providing a control signal to the vehicle driving device 600 according to navigation information received from the navigation system 770.

The park-out system 740 may perform park-out of the vehicle 100 by providing a control signal to the vehicle driving device 600 according to object information received from the object detection device 300.

The park-out system 740 may perform park-out of the vehicle 100 by providing a control signal to the vehicle driving device 600 according to a signal received from an external device via the communication device 400.

Conceptually, the park-out system 740 may be a system that includes at least one of the UI device 200, the object detection device 300, the communication device 400, the driving manipulation device 500, the vehicle driving device 600, the navigation system 770, the sensing unit 120, or the controller 170 and performs park-out of the vehicle 100.

The park-out system 740 may be referred to as a vehicle park-out control device.

The park-in system 750 may perform park-in of the vehicle 100.

The park-in system 750 may perform park-in of the vehicle 100 by providing a control signal to the vehicle driving device 600 according to navigation information received from the navigation system 770.

The park-in system 750 may perform park-in of the vehicle 100 by providing a control signal to the vehicle driving device 600 according to object information received from the object detection device 300.

The park-in system 750 may perform park-in of the vehicle 100 by providing a control signal to the vehicle driving device 600 according to a signal received from an external device via the communication device 400.

Conceptually, the park-in system 750 may be a system that includes at least one of the UI device 200, the object detection device 300, the communication device 400, the driving manipulation device 500, the vehicle driving device 600, the navigation system 770, the sensing unit 120, or the controller 170, and performs park-in of the vehicle 100.

The park-in system 750 may be referred to as a vehicle park-in control device.

The navigation system 770 may provide navigation information. The navigation information may include at least one of map information, set destination information, route information according to setting of a destination, information about various objects on a route, lane information, or information about a current location of a vehicle.

The navigation system 770 may include a memory and a processor. The memory may store navigation information. The processor may control operation of the navigation system 770.

In some implementations, the navigation system 770 may receive information from an external device via the communication device 400 and update pre-stored information with the received information.

In some implementations, the navigation system 770 may be classified as a sub-component of the UI device 200.

The sensing unit 120 may sense the state of the vehicle. The sensing unit 120 may include an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tier sensor, a steering sensor for rotation of the steering wheel, an in-vehicle temperature sensor, an in-vehicle humidity sensor, an ultrasonic sensor, an illuminance sensor, an acceleration pedal position sensor, and a brake pedal position sensor.

The inertial navigation unit (IMU) sensor may include one or more of an acceleration sensor, a gyro sensor, and a magnetic sensor.

The sensing unit 120 may acquire sensing signals of vehicle position information, vehicle motion information, vehicle yaw information, vehicle roll information, vehicle pitch information, vehicle collision information, vehicle heading information, vehicle location information (GPS information), vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and the like.

The sensing unit 120 may further include an accelerator pedal sensor, a pressure sensor, an engine speed sensor, an Air Flow Sensor (AFS), an air temperature sensor (ATS), a water temperature sensor (WTS), a throttle position sensor (TPS), a top dead center (TDC) sensor, a crank angle sensor (CAS), and the like.

The sensing unit 120 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and the like.

The interface unit 130 serves as a path to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path along which electric energy is supplied to a connected mobile terminal. When the mobile terminal is electrically connected to the interface unit 130, the interface unit 130 may supply electric energy received from the power supply 190 to the mobile terminal under control of the controller 170.

The memory 140 is electrically connected to the controller 170. The memory 140 may store default data for a unit, control data for controlling the operation of the unit, and input/output data. The memory 140 may be any of various storage devices in hardware, such as Read Only Memory (ROM), Random Access Memory (RAM), Erasable and Programmable ROM (EPROM), flash drive, and hard drive. The memory 140 may store various data for overall operations of the vehicle 100, such as programs for processing or control in the controller 170.

In some implementations, the memory 140 may be integrated with the controller 170, or configured as a sub-component of the controller 170.

The controller 170 may control overall operation of the respective units in the vehicle 100. The controller 170 may be referred to as an electronic control unit (ECU).

The power supply 190 may supply power required for operation of each component under control of the controller 170. In particular, the power supply 190 may be supplied with power from a battery or the like in the vehicle.

One or more processors and the controller 170, included in the vehicle 100, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

Figure 8A:
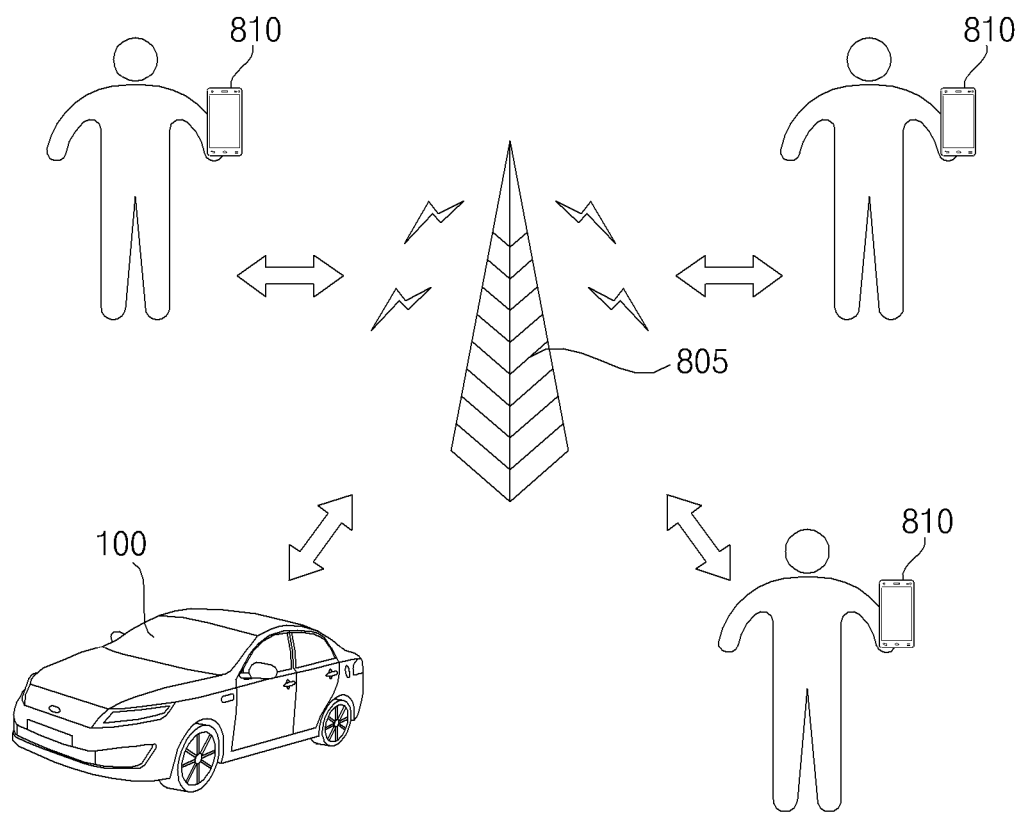
FIGS. 8A and 8B are diagrams illustrating an example communication system.
Figure 8B:
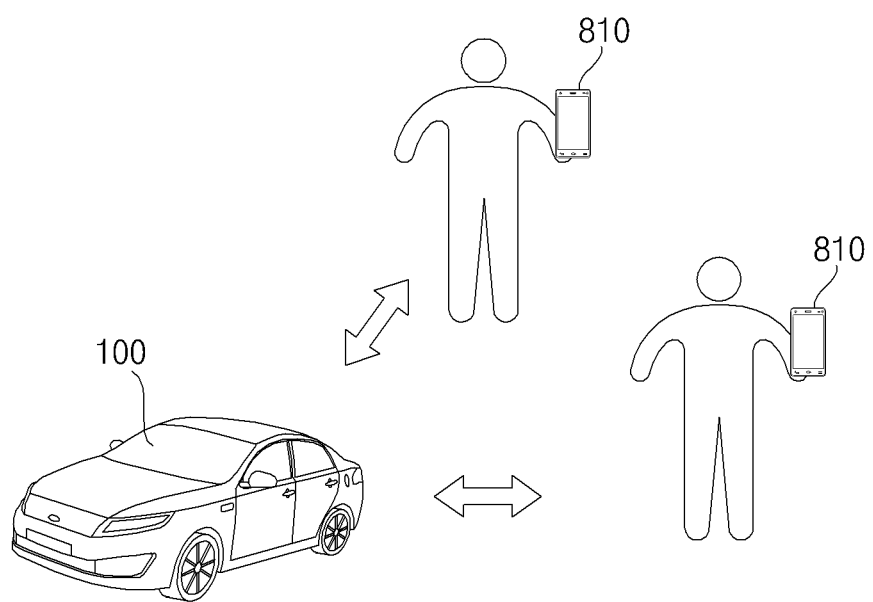

FIGS. 8A and 8B illustrate an example communication system. As shown in FIG. 8A, the vehicle 100 may perform vehicle-to-pedestrian (V2P) communication with one or more mobile terminals 810 via a base station 805, using the vehicle communication device 400.

The mobile terminal 810, which is a communication device carried by a person, may conceptually include a smartphone, a wearable device and a laptop.

The vehicle communication device 400 may recognize the mobile terminal 810 as a person.

The vehicle communication device 400 may acquire location information and movement information about a person based on the location information and movement information about the mobile terminal 810.

The base station 805 may conceptually include a road side unit (RSU).

As illustrated in FIG. 8B, the vehicle 100 may directly perform vehicle-to-pedestrian (V2P) communication with the mobile terminal 810 via the vehicle communication device 400.

The vehicle 100 may perform V2P communication with the mobile terminal 810 through a first communication scheme and/or a second communication scheme.

The first communication scheme referred to in this specification may be the V2X technology of IEEE802.11p. For example, the first communication scheme may be an ITS (intelligent transportation system)-G5 scheme or a WAVE (Wireless Access in Vehicular Environment) scheme.

The second communication scheme referred to in this specification may be a mobile communication technology. For example, the second communication scheme may be a 5G scheme or an LTE (Long-Term Evolution) scheme.

According to an implementation, the first communication scheme and the second communication scheme may use frequencies of a first band. In this case, the first communication scheme may use frequencies of a first subband. The second communication scheme may use frequencies of a second subband. The first subband and the second subband may be included in the first band.

According to an implementation, the first communication scheme may use frequencies of a first band. The second communication scheme may use frequencies of a second band.

Figure 9:
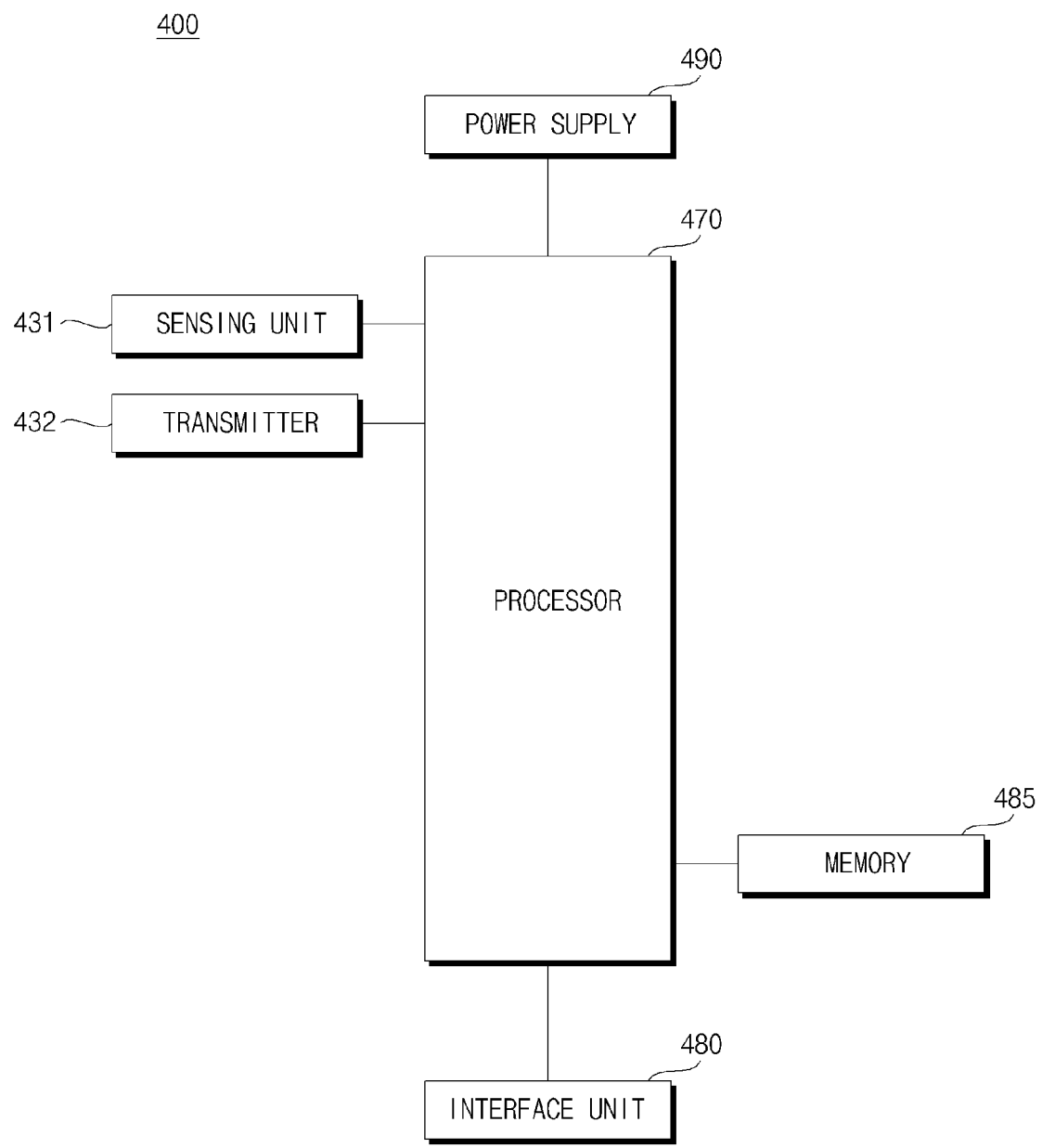
FIG. 9 is a diagram illustrating an example communication device.

FIG. 9 is a diagram illustrating an example communication device.

Referring to FIG. 9, the vehicle 100 is capable of performing communication (V2P communication or V2X communication) with mobile terminals.

The vehicle communication device 400 may be referred to as a V2X communication device.

The vehicle communication apparatus 400 may include a receiver 431, a transmitter 432, a processor 470, an interface section 480, a memory 485 and a power supply 490.

The receiver 431 and the transmitter 432 may be included in the V2X communication unit 430.

The receiver 431 may receive information, data or signals from the mobile terminal 810.

The receiver 431 may include a reception radio frequency (RF) circuit including a receive antenna.

The receiver 431 may receive location information about each of a plurality of mobile terminals 810 from the plurality of mobile terminals 810.

The location information may include information about the point at which the mobile terminal 810 is located and information about change in the point at which the mobile terminal 810 is located.

The change information about the locations of the mobile terminals 810 may be referred to as movement information about the mobile terminal 810.

The receiver 431 may be operated under control of the processor 470.

The transmitter 432 may transmit information, data, or signals to an external device.

The transmitter 432 may include an RF circuit including a transmit antenna.

The transmitter 432 may be operated under control of the processor 470.

According to an implementation, the receiver 431 and the transmitter 432 may be integrated with each other. In this case, the reception RF circuit and the transmission RF circuit may be integrated into a communication RF circuit.

The processor 470 may be electrically connected to the respective units of the communication device 400.

The processor 470 may control the overall operation of the respective units of the communication device 400.

The processor 470 may control the receiver 431 and the transmitter 432.

The processor 470 may process signals, information or data received via the receiver 431.

The processor 470 may receive signals, information or data from other devices in the vehicle 100 via the interface unit 480.

The processor 470 may process signals, information or data received from other devices in the vehicle 100 and transmit the signals, information or data to an external device via the transmitter 432.

The processor 470 may filter information about a mobile terminal to be included in the information about objects used for travel of the vehicle among the pieces of information about a plurality of mobile terminals based on the location information about each of the plurality of mobile terminals.

The processor 470 may control the filtered information to be output through the UI device 200.

The interface unit 480 may exchange signals, information, or data with other devices included in the vehicle 100.

The interface unit 480 may receive signals, information, or data from other devices included in the vehicle 100.

The interface unit 480 may transmit the received signals, information, or data to the processor 470.

The interface unit 480 may transmit signals, information or data generated or processed by the processor 470 to other devices included in the vehicle 100.

The memory 485 is electrically connected to the processor 470. The memory 485 may store default data for a unit, control data for controlling the operation of the unit, and input/output data. The memory 485 may be any of various hardware storage devices, such as ROM, RAM, EPROM, a flash drive, and a hard drive. The memory 485 may store various data for overall operations of the communication device 400, such as programs for processing or control in the processor 470.

In some implementations, the memory 485 may be integrated with the processor 470, or configured as a subcomponent of the processor 470.

The power supply 490 may supply power required for operation of each component under control of the processor 470. In particular, the power supply 490 may be supplied with power from a battery or the like in the vehicle.

Figure 10:
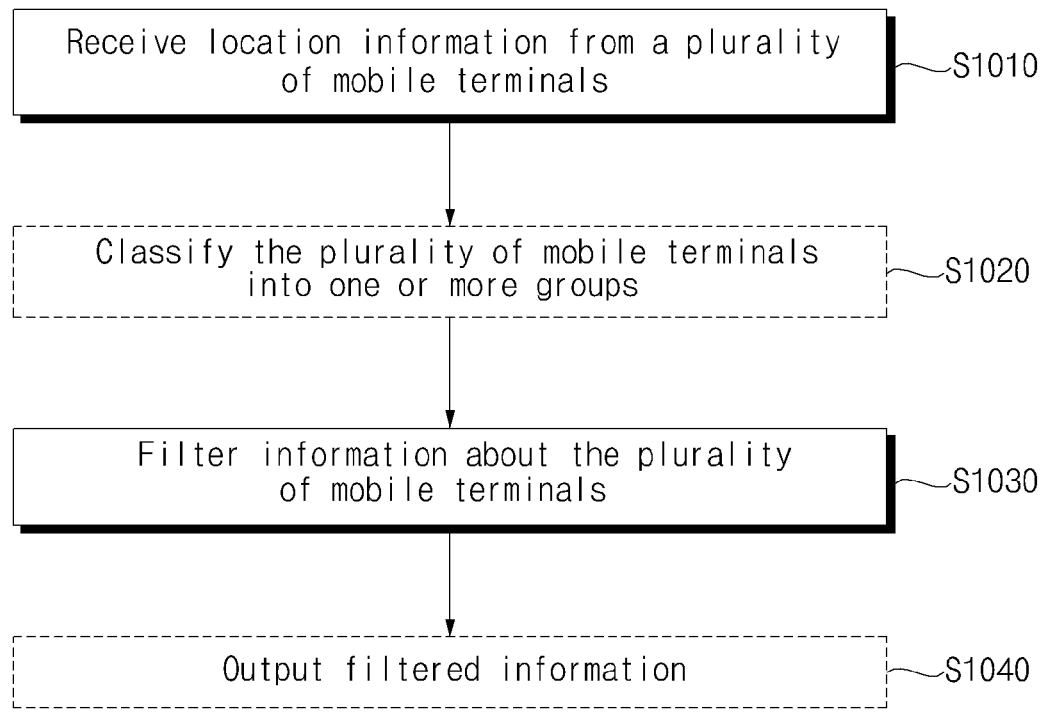
FIG. 10 is a flowchart illustrating an example method to operate a communication device for a vehicle.

FIG. 10 illustrates example method to operate a communication device for a vehicle.

Referring to FIG. 10, a method 800 for acquiring information about a pedestrian may include receiving location information about each of a plurality of mobile terminals 810 (S1010) and filtering information about the plurality of mobile terminals 810 (S1030).

The receiver 431 may receive location information about each of the plurality of mobile terminals 810 from the plurality of mobile terminals 810 (S1010).

The processor 470 may filter information about the plurality of mobile terminals 810 based on the location information of each of the plurality of mobile terminals 810 (S1030).

The processor 470 may filter information about a mobile terminal to be included in the information about objects used for travel of the vehicle 100 among the pieces of information about a plurality of mobile terminals 810 based on the location information about each of the plurality of mobile terminals 810.

The processor 470 may recognize the information about the mobile terminal 810 as information about a person (e.g., a pedestrian).

For example, the processor 470 may determine that a person is located at a first point, based on the information about the mobile terminal 810 located at the first point.

For example, the processor 470 may determine that a person is moving from a first point to a second point, based on the information about the mobile terminal 810 moving from the first point to the second point.

The location information may include information about the point at which the mobile terminal 810 is located and information about change in the point at which the mobile terminal 810 is located.

The location information may include movement information about the mobile terminal 810.

The location information may conceptually include altitude information about a mobile terminal.

The processor 470 may filter information about the mobile terminal 810 based on whether the mobile terminal 810 is located inside the building.

The processor 470 may filter information about the mobile terminal 810 based on a point at which the mobile terminal 810 is located on a sidewalk.

The processor 470 may filter information about the mobile terminal 810 based on whether the mobile terminal 810 is located inside another vehicle.

The processor 470 may filter information about the mobile terminal 810 based on whether the mobile terminal 810 is located at a point over which the vehicle 100 has already passed.

The processor 470 may filter information about the mobile terminal 810 based on whether the mobile terminal 810 is located in a caution area.

The processor 470 may filter information about the mobile terminal 810 based on the altitude information about the mobile terminal 810.

In some implementations, the method 1000 for acquiring information about a pedestrian may further include, between steps S1010 and S1020, classifying the plurality of mobile terminals 810 into one or more groups (S1020).

The processor 870 may classify a plurality of mobile terminals 810 into one or more groups based on the location information about each of the plurality of mobile terminals (S1020).

The processor 870 may group one or more mobile terminals 810 located inside the same building.

The processor 870 may classify one or more mobile terminals 810 located in a predetermined area of a sidewalk into a group.

The processor 870 may group one or more mobile terminals 810 located in another vehicle.

The processor 870 may group one or more mobile terminals 810 located inside a predetermined altitude range.

In some implementations, the method 1000 for acquiring information about a pedestrian may further include, after step S1030, controlling a graphical object corresponding to the filtered information to be output (S1040).

The processor 870 may control the graphical object corresponding to the filtered information about a mobile terminal to be output through the UI device 200 (S1040).

The processor 870 may provide the filtered information about the mobile terminal to the UI device 200.

The UI device 200 may output a graphical object corresponding to the filtered information about the mobile terminal.

Figure 11:
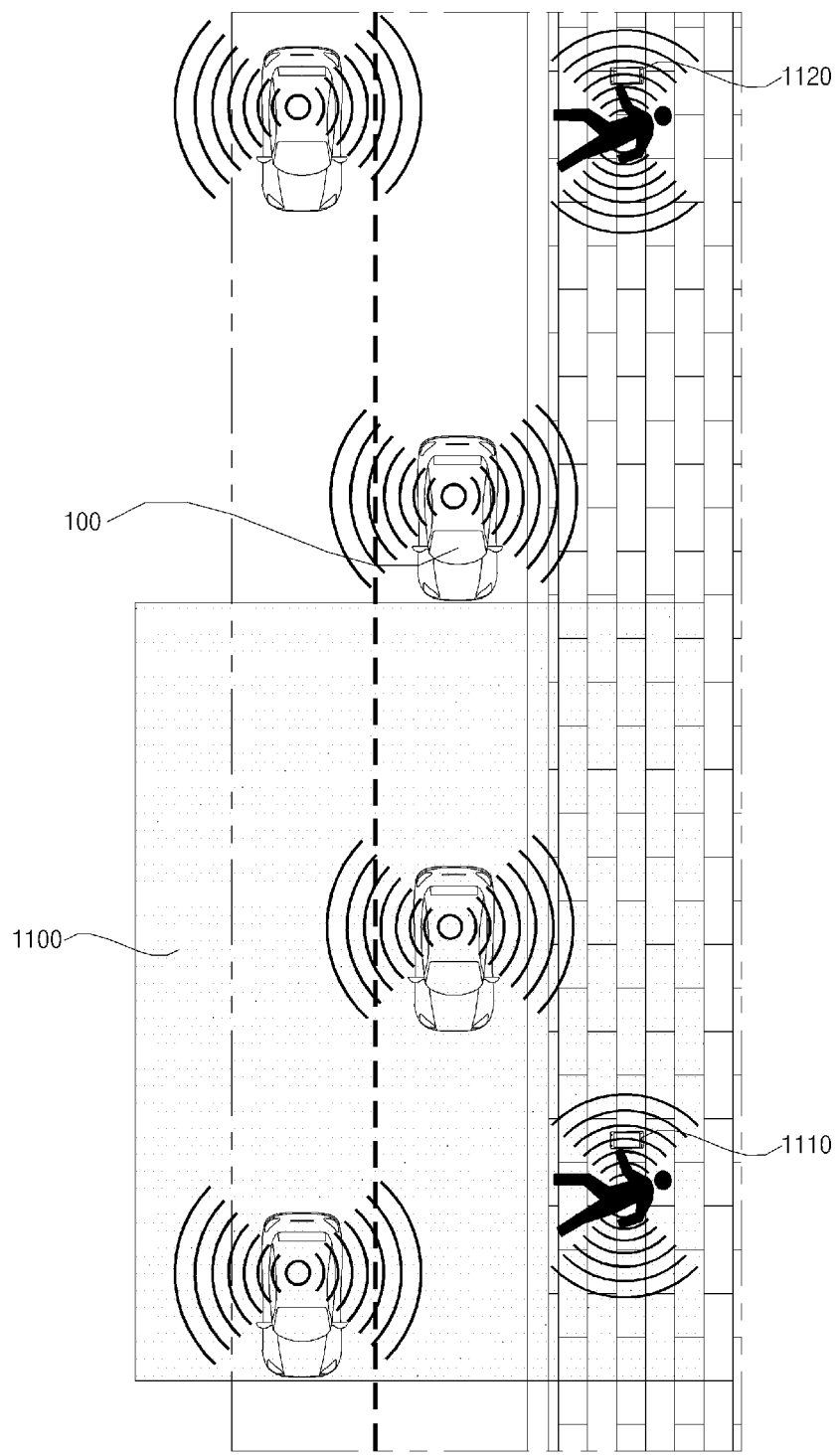
FIG. 11 is a diagram illustrating an example method to operate a communication device for a vehicle.

FIG. 11 illustrates an example method to operate a communication device for a vehicle.

Referring to FIG. 11, the processor 470 may set a region of interest (ROI) 1100.

The processor 470 may set the ROI 1100 based on the driving situation information about the vehicle 100.

The processor 470 may set the ROI 1100 based on at least one of information about objects outside the vehicle, navigation information, or vehicle state information.

The processor 470 may change the predetermined ROI 1100 based on the driving situation information about the vehicle 100.

The processor 470 may change the position or size of the predetermined ROI 1100 based on the driving situation information about the vehicle 100.

The processor 470 may filter information about a mobile terminal to be included in the information about objects used for travel of the vehicle 100 among the pieces of information about a plurality of mobile terminals, based on the ROI 1100.

For example, the processor 470 may include a first mobile terminal 1110 located in the ROI 1100 in the information about objects used for travel of the vehicle 100.

For example, the processor 470 may exclude a second mobile terminal 1120 located outside the ROI 1100 from the information about objects used for travel of the vehicle 100.

Figure 12:
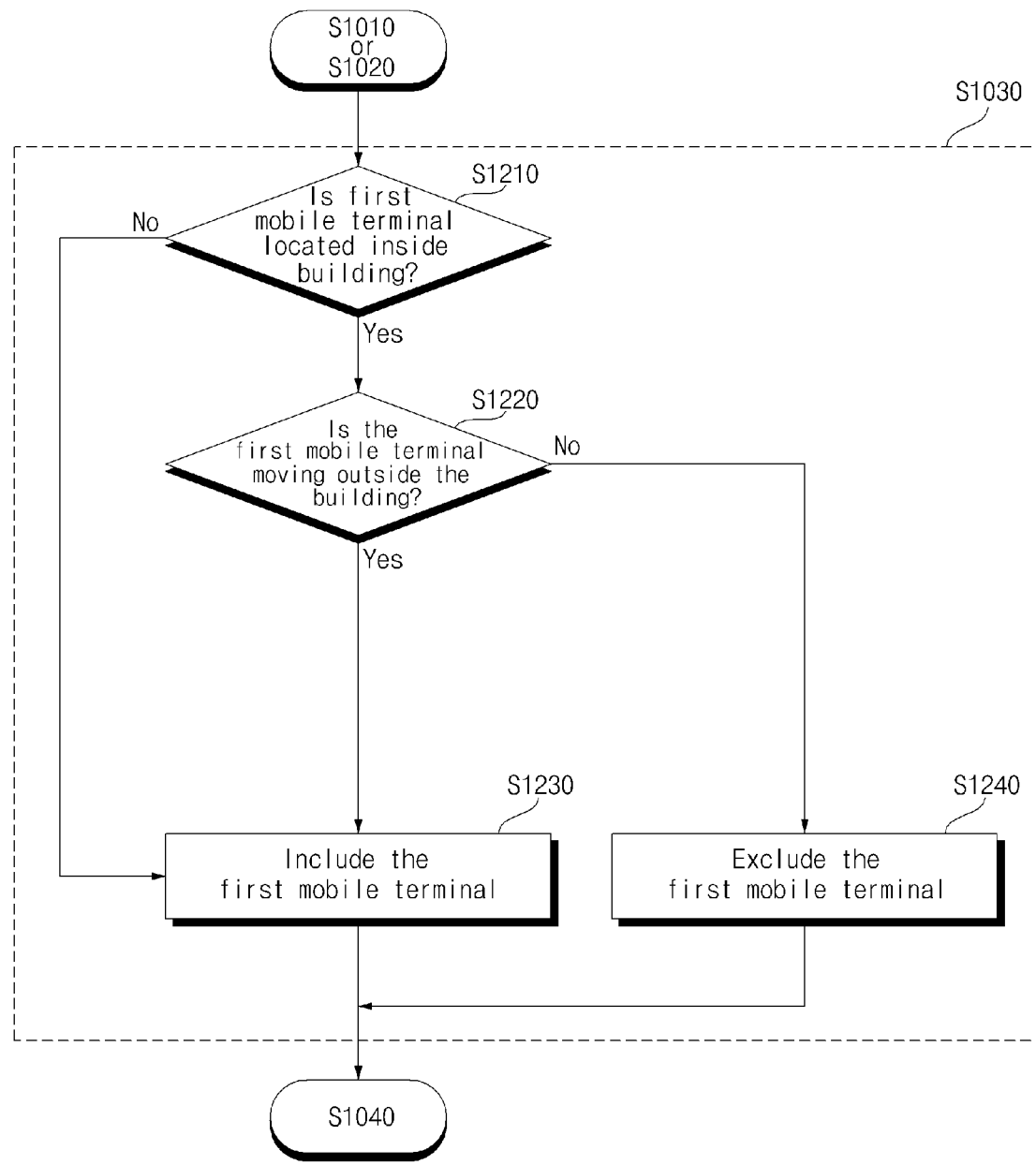
FIGS. 12 to 21 are flowcharts and diagrams illustrating example methods to determine whether information about a mobile terminal is included in information about objects.
Figure 13:
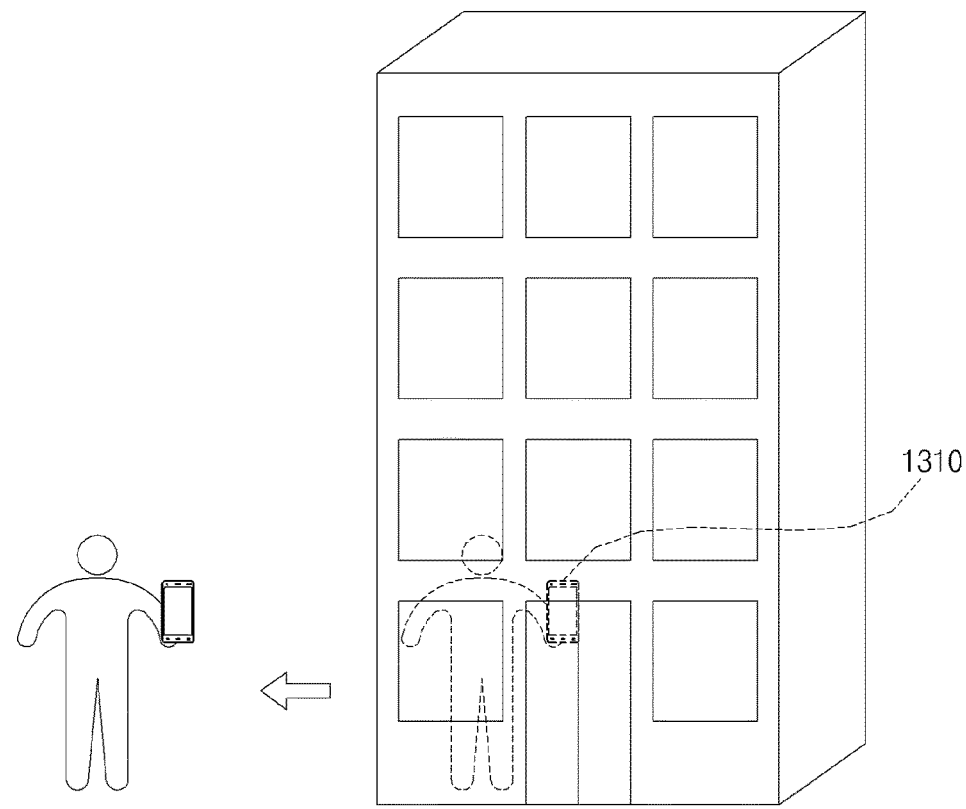
Figure 13:
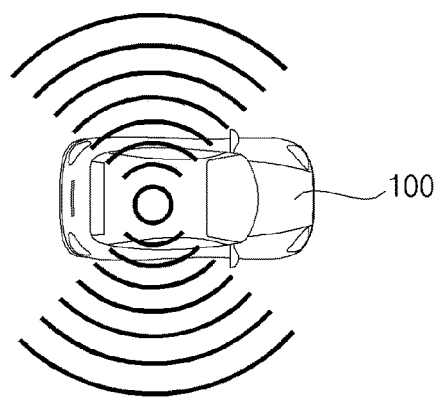

FIGS. 12 and 13 illustrate an example method to determine whether information about a mobile terminal should be included in information about objects.

Referring to FIGS. 12 and 13, the filtering step S1030 may include determining whether a first mobile terminal 1310 is located inside a building (S1210) and determining whether the first mobile terminal 1310 is moving outside the building 1320 (S1220), including information about the first mobile terminal 1310 in information about objects (S1230), excluding the information about the first mobile terminal 1310 from the information about objects (S1240).

The processor 470 may determine whether the first mobile terminal 1310 is located inside the building 1320 based on the location information about the first mobile terminal 1310 (S1210).

The processor 470 may determine whether the first mobile terminal 1310 is located inside the building 1320 based on the point information about the first mobile terminal 1310.

If it is determined that the first mobile terminal 1310 is located inside the building 1320, the processor 470 may exclude the information about the first mobile terminal 1310 from the information about objects (S1240).

After it is determined that the first mobile terminal 1310 is located inside the building 1320, the processor 470 may determine, based on information about change of the point of the first mobile terminal 1310, whether the first mobile terminal 1310 is moving outside the building 1320 (S1220).

If it is determined that the first mobile terminal 1310 is moving outside the building 1320, the processor 470 may include the information about the first mobile terminal 1310 in the information about objects (S1230).

If it is determined that the first mobile terminal 1310 is not moving outside the building 1320, the processor 470 may exclude the information about the first mobile terminal 1310 from the information about objects (S1240).

Figure 14:
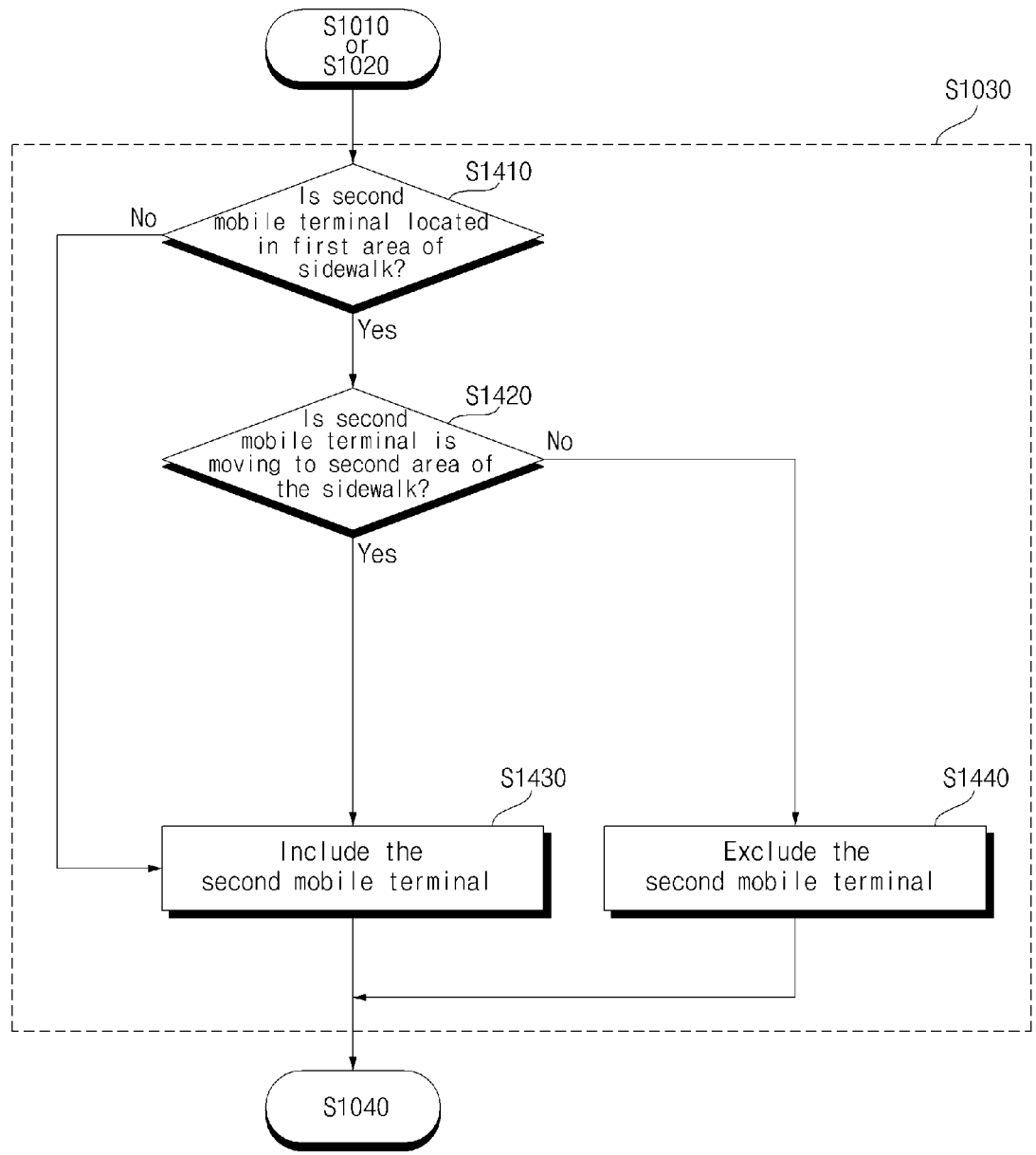
Figure 15:
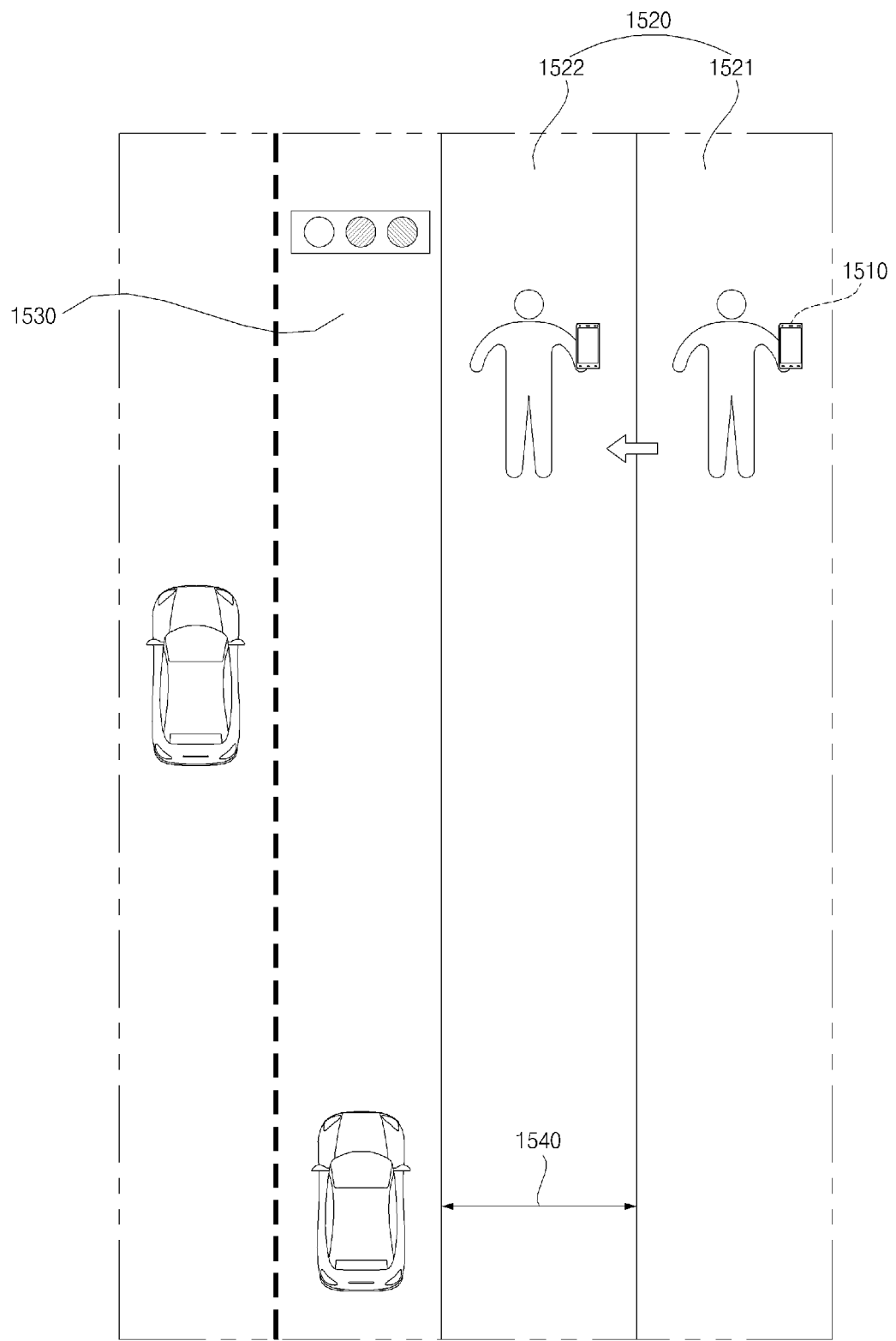

FIGS. 14 and 15 illustrate an example method to determine whether information about a mobile terminal should be included in information about objects.

Referring to FIGS. 14 and 15, the filtering step S1030 may include determining whether a second mobile terminal 1510 is located in a first area 1521 of a sidewalk (S1410), determining whether the second mobile terminal 1510 is moving to a second area 1522 of the sidewalk (S1420), including information about the second mobile terminal 1510 in the information about objects (S1430), and excluding the information about the second mobile terminal 1510 from the information about objects (S1440).

The processor 470 may determine whether the second mobile terminal 1510 is located in the first area 1521 based on the location information about the second mobile terminal 1510 (S1410).

The processor 470 may determine whether the second mobile terminal 1510 is in the first area 1521 of the sidewalk 1520 that is spaced more than a reference distance 1540 from a roadway 1530 based on the location information about the second mobile terminal 1510.

If it is determined that the second mobile terminal 1510 is located in the first area 1521, the processor 470 may exclude information about the second mobile terminal 1510 from the information about objects (S1440).

After the processor 470 determines that the second mobile terminal 1510 is located in the first area 1521, the processor 470 may determine, based on the information about change in point of the second mobile terminal 1510, whether the second mobile terminal 1510 is moving from the first area 1521 to the second area 1522 (S1420). Here, the second area 1522 may be an area within a reference distance 1540 from a roadway 1530.

If it is determined that the second mobile terminal 1510 is moving from the first area 1521 to the second area 1522, the processor 470 may include the information about the second mobile terminal 1510 in the information about objects (S1430).

If it is determined that the second mobile terminal 1510 is moving from the first area 1521 to the second area 1522, the processor 470 may exclude the information about the second mobile terminal 1510 from the information about objects (S1440).

Figure 16:
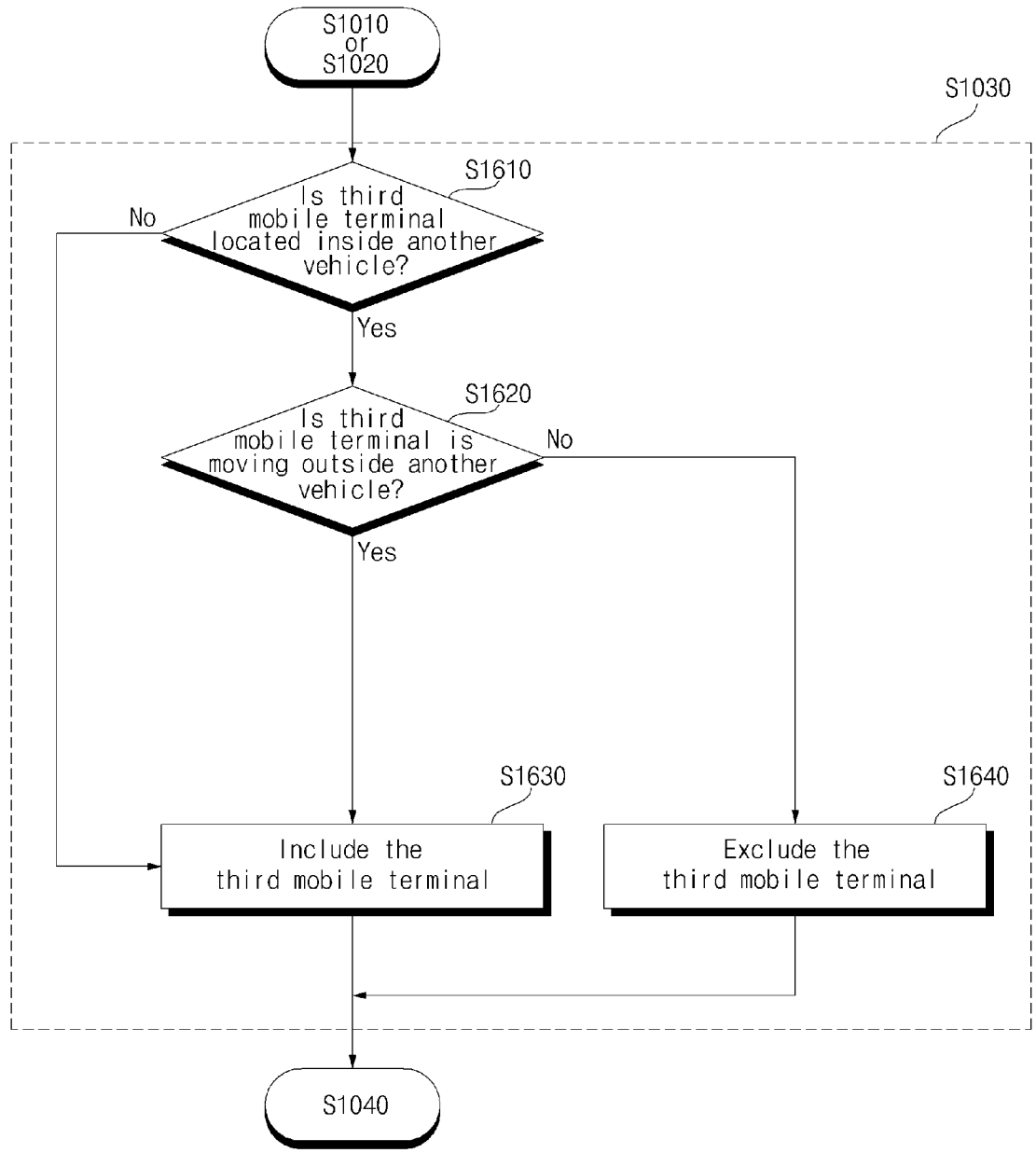
Figure 17:
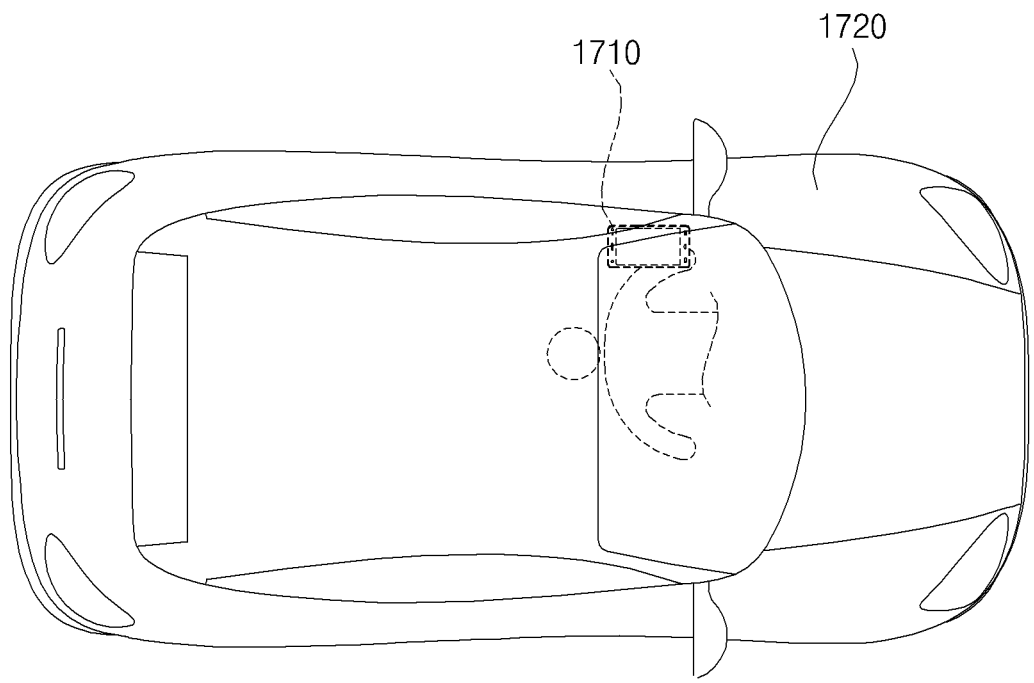

FIGS. 16 and 17 illustrate an example method to determine whether information about a mobile terminal should be included in information about objects.

Referring to FIGS. 16 and 17, the filtering step S1030 may include determining whether a third mobile terminal 1710 is located inside another vehicle 1720 (S1610), determining whether the third mobile terminal 1710 is moving outside the other vehicle 1720 (S1620), including information about the third mobile terminal 1710 in the information about objects (S1630), and excluding the information about the third mobile terminal 1710 from the information about objects (S1640).

The processor 470 may determine whether the third mobile terminal 1710 is located inside the other vehicle 1720 based on the location information about the third mobile terminal 1710 (S1610).

The processor 470 may determine whether the third mobile terminal 1710 is located inside the other vehicle 1720 based on the location information about the third mobile terminal 1710 and the location information about the other vehicle 1720.

The processor 470 may determine whether the third mobile terminal 1710 is located inside the other vehicle 1720 based on the point information about the third mobile terminal 1710.

In some implementations, the processor 470 may receive information about connection of the third mobile terminal 1710 to the other vehicle 1720 for wired or short-range wireless communication, and determine, based on the connection information, whether the third mobile terminal 1710 is located inside the other vehicle 1720.

In some implementations, the processor 470 may receive moving speed information about the third mobile terminal 1710, and determine, based on the moving speed information, whether the third mobile terminal 1710 is located inside the other vehicle 1720.

In some implementations, the processor 470 may receive information about the distance between the third mobile terminal 1710 and the other vehicle 1720, and determine, based on the distance information, whether the third mobile terminal 1710 is located inside the other vehicle 1720.

If it is determined that the third mobile terminal 1710 is located inside the other vehicle 1720, the processor 470 may exclude information about the third mobile terminal 1710 from the information about objects (S1640).

After it is determined that the third mobile terminal 1710 is located inside the other vehicle 1720, the processor 470 may determine, based on change in point of the third mobile terminal 1710, whether the third mobile terminal 1710 is moving outside the other vehicle 1720 (S1620).

If it is determined that the third mobile terminal 1710 is moving outside the other vehicle 1720, the processor 470 may include the information about the third mobile terminal 1710 in the information about objects (S1630).

If it is determined that the third mobile terminal 1710 is not moving outside the other vehicle 1720, the processor 470 may exclude the information about the third mobile terminal 1720 from the information about objects (S1640).

Figure 18:
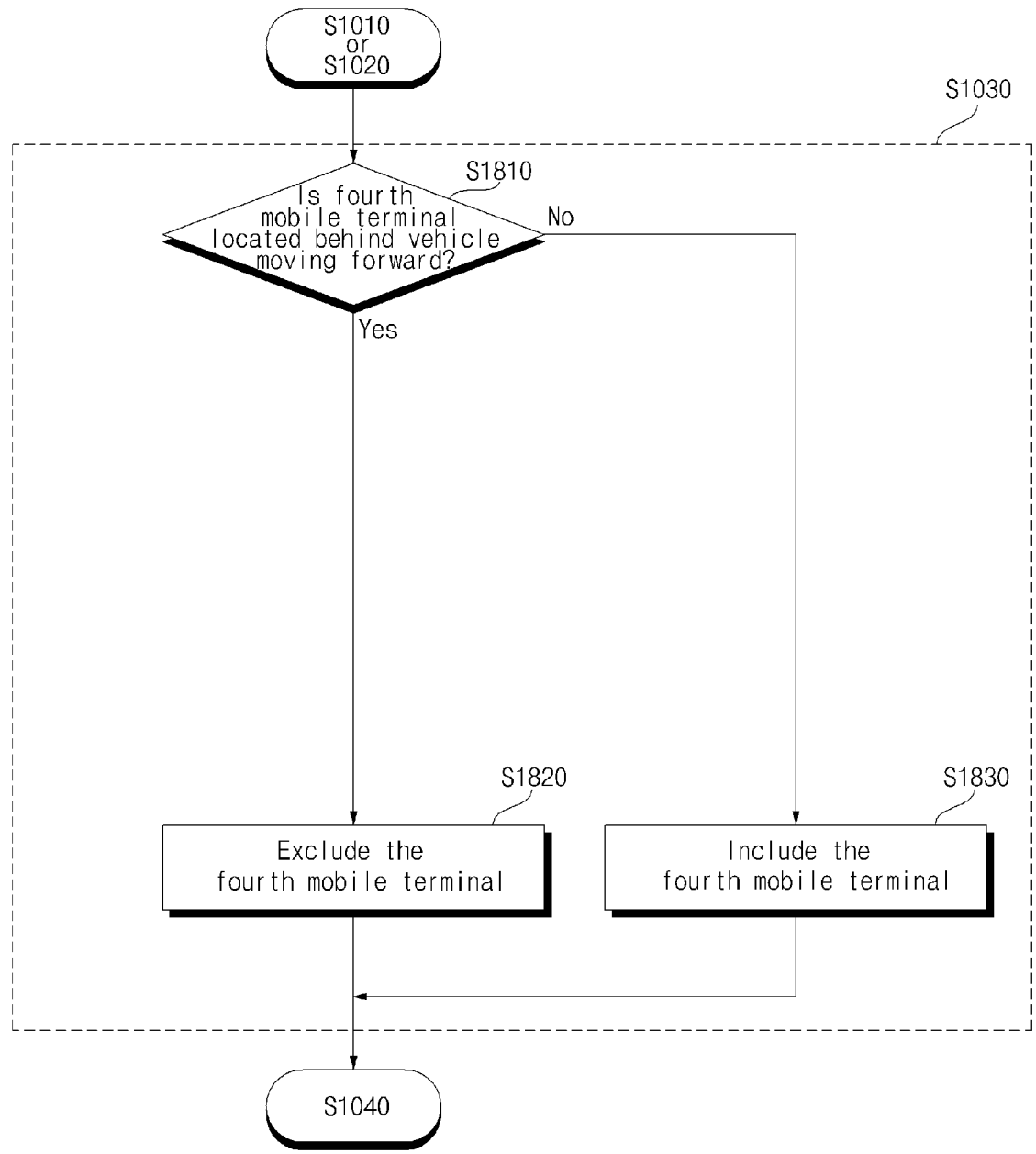
Figure 19:
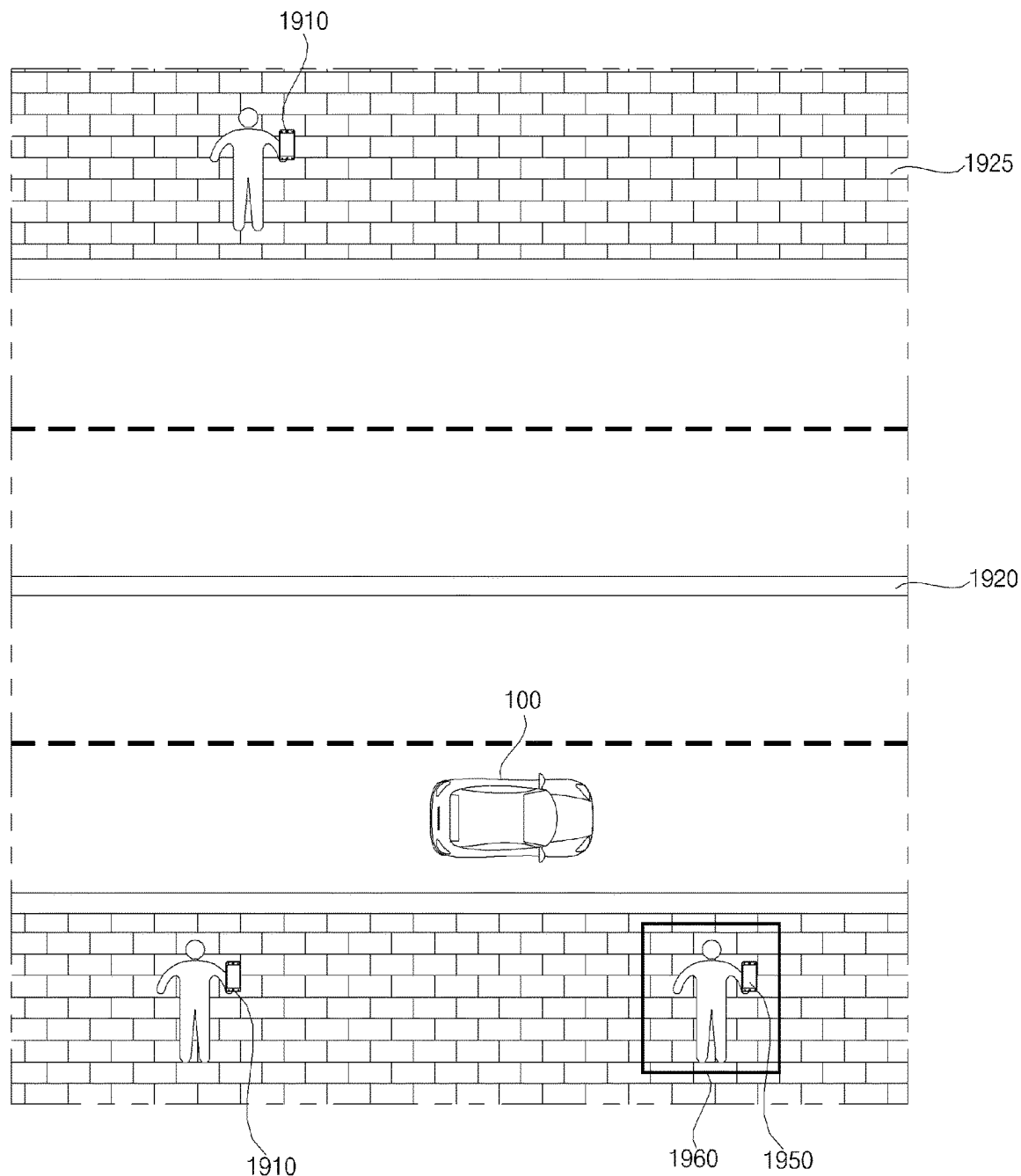

FIGS. 18 and 19 illustrate an example method to determine whether information about a mobile terminal is included in information about objects.

Referring to FIGS. 18 and 19, the filtering step S1030 may include determining whether a fourth mobile terminal 1910 is located behind a vehicle 100 moving forward (S1810), and excluding information about the fourth mobile terminal 1910 from the information about objects, and including the information about the fourth mobile terminal (1910) in the information about objects (S1830).

The processor 470 may determine whether the fourth mobile terminal 1910 is located behind the vehicle 100 moving forward, based on the location information about the fourth mobile terminal 1910 (S1810).

The processor 470 may determine whether the fourth mobile terminal 1910 is located behind the vehicle 100 moving forward, based on the location information about the fourth mobile terminal 1910.

If it is determined that the fourth mobile terminal 1910 is located behind the vehicle 100 moving forward, the processor 470 may exclude information ab out the fourth mobile terminal 1910 from the information about objects (S1820).

If it is determined that the fourth mobile terminal 1910 is not located behind the vehicle 100 moving forward, the processor 470 may include the information about the fourth mobile terminal 1910 in the information about the object (S1830).

As illustrated in FIG. 19, the processor 470 may determine whether or not the fourth mobile terminal 1910 is located on a sidewalk 1925 on the opposite side of a center line 1920, based on the point information about the fourth mobile terminal 1910.

If it is determined that the fourth mobile terminal 1910 is located on the sidewalk 1925 on the opposite side of the center line 1920, the processor 270 may exclude information about the fourth mobile terminal 1910 from the information about objects.

If it is determined that the fourth mobile terminal 1910 is not located on the sidewalk 1925 on the opposite side of the center line 1920, the processor 270 may include the information about the fourth mobile terminal 1910 in the information about objects.

As illustrated in FIG. 19, the processor 270 may determine whether a fifth mobile terminal 1950 is located in a caution area 1960, based on the location information about the fourth mobile terminal 1910.

If it is determined that the fifth mobile terminal 1950 is located in the caution area 1960, the processor 470 may include information about the fifth mobile terminal 1950 in the information about objects.

If it is determined that the fifth mobile terminal 1950 is not located in the caution area 1960, the processor 470 may exclude information about the fifth mobile terminal 1950 from the information about objects.

The caution area may include a bus stop area, a parking area, and an area where the number of mobile terminals located in a unit area is greater than or equal to a reference number.

The area where the number of terminals located in a unit area is greater than or equal to the reference number may be understood as a pedestrian-crowded area.

Conceptually, the caution area 1960 may be included in the ROI described above.

Figure 20:
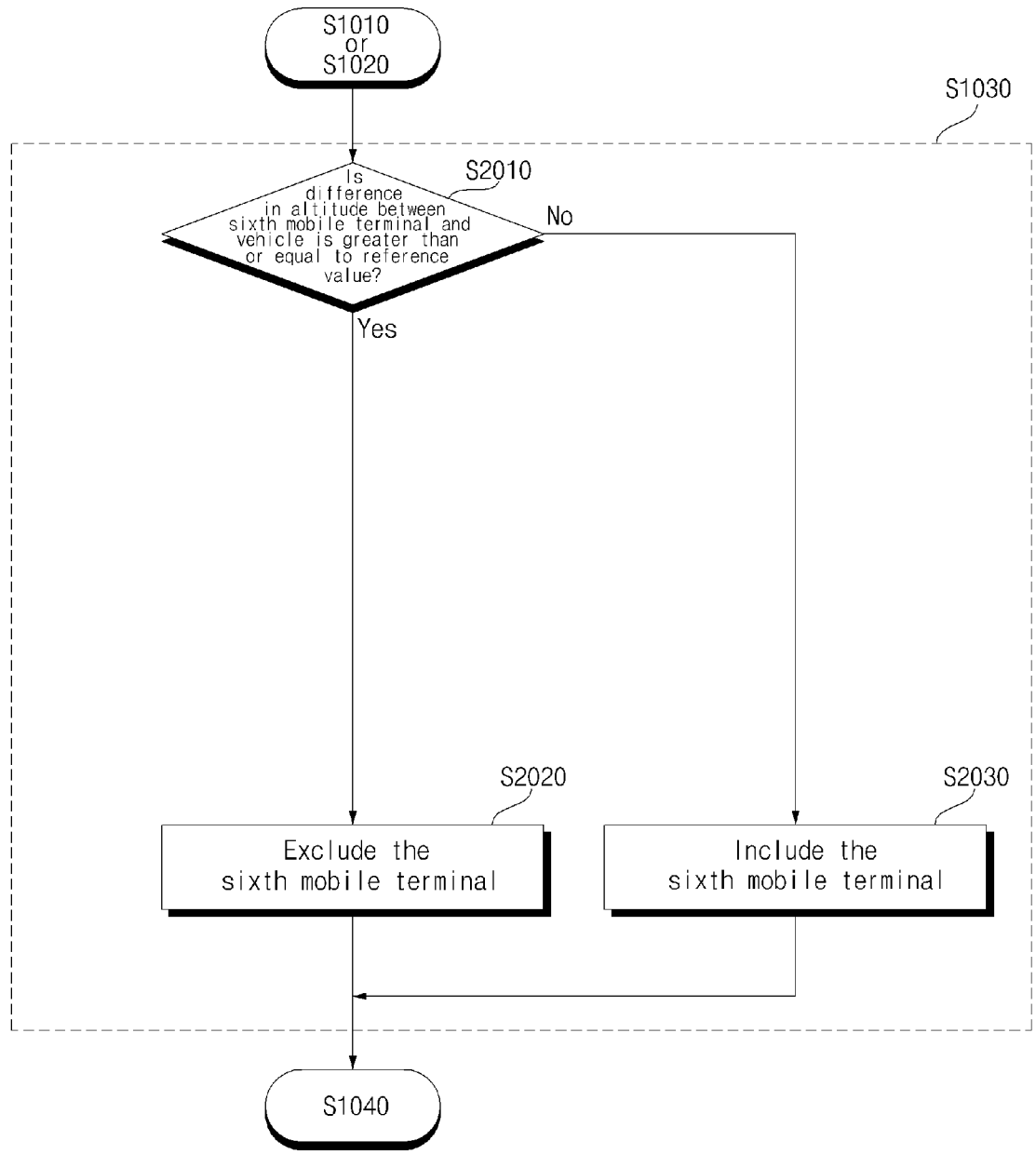
Figure 21:
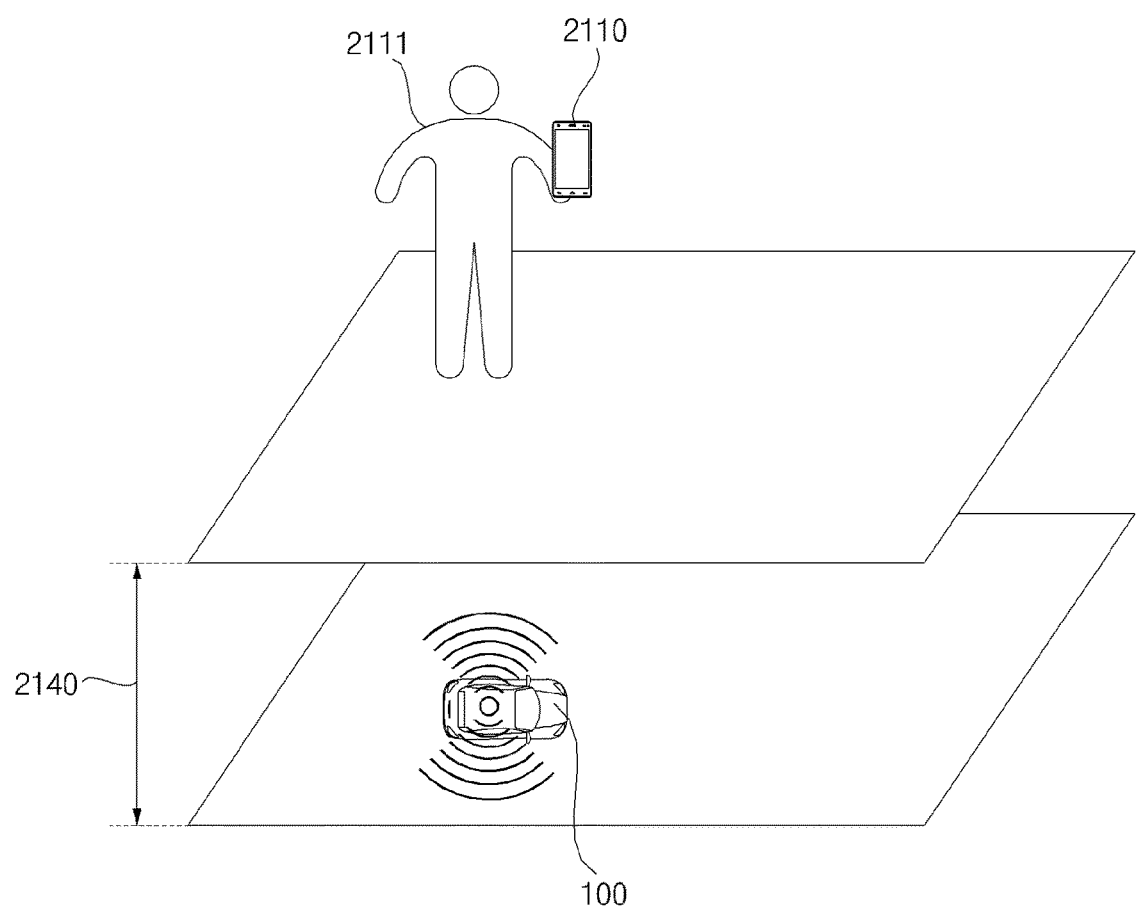

FIGS. 20 and 21 illustrate an example method to determine whether information about a mobile terminal is included in information about objects.

Referring to FIGS. 20 and 21, the filtering step S1030 may include determining whether a difference in altitude between a sixth mobile terminal 2110 and the vehicle 100 is greater than or equal to a reference value, based on the altitude information about the sixth mobile terminal 2110 (S2010), excluding information about the sixth mobile terminal 2110 from information about objects (S2020), and including the information about the sixth mobile terminal 2110 in the information about objects (S2030).

The processor 470 may determine whether the difference 2140 in altitude between the sixth mobile terminal 2110 and the vehicle 100 is greater than or equal to a reference value, based on the altitude information about the sixth mobile terminal 2110 (S2010).

The processor 470 may compare the altitude information about the sixth mobile terminal 2110 with the altitude information about the vehicle 100 to determine whether the difference in altitude between the sixth mobile terminal 2110 and the vehicle 100 is greater than or equal to the reference value.

If it is determined that the difference 2140 in altitude between the sixth mobile terminal 2110 and the vehicle 100 is greater than or equal to the reference value, the processor 470 may exclude information about the sixth mobile terminal 2110 from information about objects (S2020).

If the difference 2140 in altitude between the sixth mobile terminal 2110 and the vehicle 100 is less than the reference value, the processor 470 may include the information about the sixth mobile terminal 2110 in the information about objects (S2030).

For example, when a person 2111 and the vehicle 100 are located in the same building but are located at different floors, the vehicle 100 may travel while excluding the person 2111 from the information about objects.

For example, when the person 2111 is walking on an overpass, the vehicle 100 may travel while excluding the person 2111 from the information about objects.

FIGS. 22A to 22D illustrate an example method to classify at least one mobile terminal into a group.

The method 1000 for acquiring information about a pedestrian may further include classifying a plurality of mobile terminals into one or more groups (S1020).

In the classifying step S1020, the processor 470 may classify the plurality of mobile terminals into one or more groups based on the location information of each of the plurality of mobile terminals.

The processor 470 may set one or more classification spaces and classify mobile terminals located in a classification space into one group.

For example, the classification space may be any one of an interior space of a building, a space of a sidewalk spaced apart from a roadway, a vehicle interior space, and a space having a different altitude from the vehicle.

In this case, the filtering step S1030 may include filtering information about a mobile terminal to be included in the object information, on a group-by-group basis.

Figure 22A:
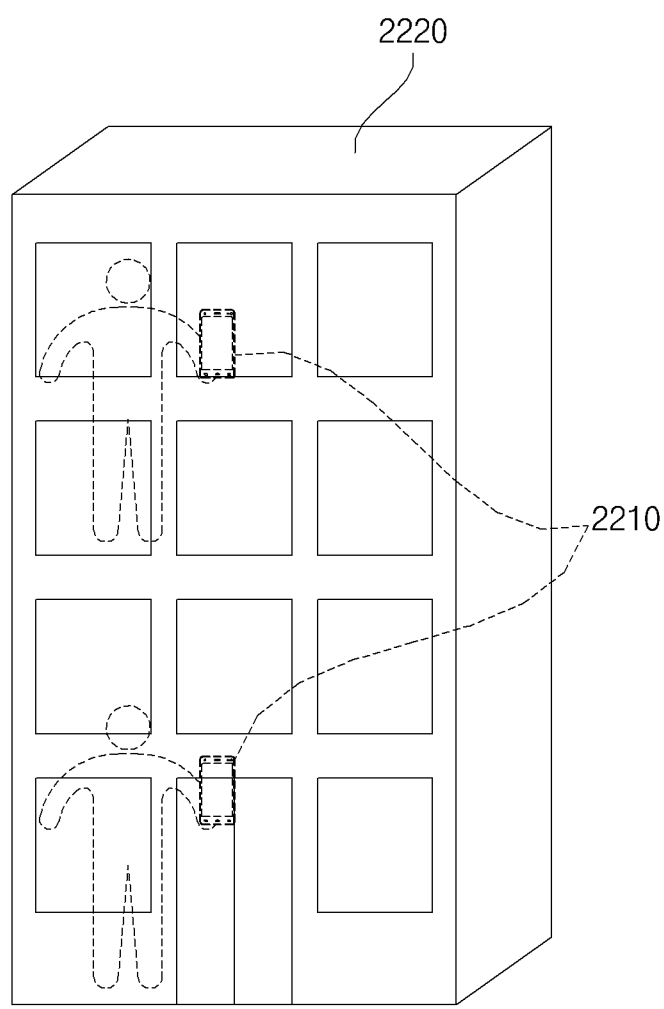
FIGS. 22A to 22D are diagrams illustrating an example method to classify at least one mobile terminal into a group.

As illustrated in FIG. 22A, the classification step S1020 may include classifying one or more mobile terminals 2210 located inside the building 2220 into a first group.

The processor 470 may determine whether the mobile terminals 2210 are located inside the building 2220 based on the location information about the one or more mobile terminals 2210.

The processor 470 may classify one or more mobile terminals 2210 located inside the building 2220 into a first group.

The filtering step S1030 may include excluding the first group from the information about objects.

The processor 470 may exclude the first group from the information about objects.

Figure 22B:
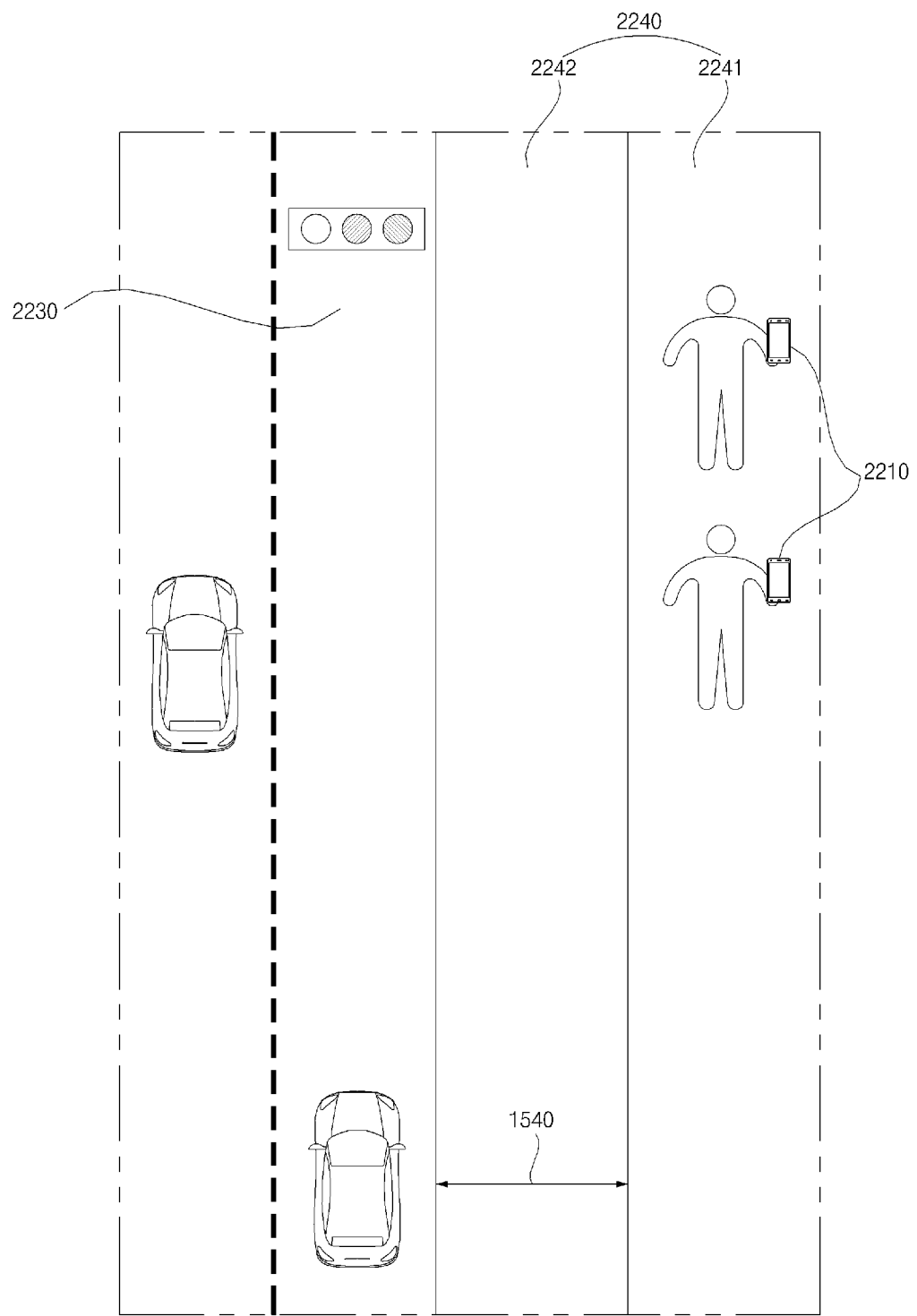

As illustrated in FIG. 22B, the classification step S1020 may include classifying one or more mobile terminals 2210 located in a first area 2241 of a sidewalk 2240 that is spaced more than a reference distance 2243 from the roadway 2230 into a second group.

The processor 470 may determine whether the mobile terminals 2210 are located in the first area 2241 that is spaced more than the reference distance 2243 from the roadway 2230, based on the location information about the one or more mobile terminals 2210.

The processor 470 may classify one or more mobile terminals 2210 located in a first area 2221 of a sidewalk 2220 that is spaced more than a reference distance 2240 from a roadway 2230 into a second group.

The filtering step S1030 may include excluding the second group from the information about objects.

The processor 470 may exclude the second group from the information about objects.

Figure 22C:
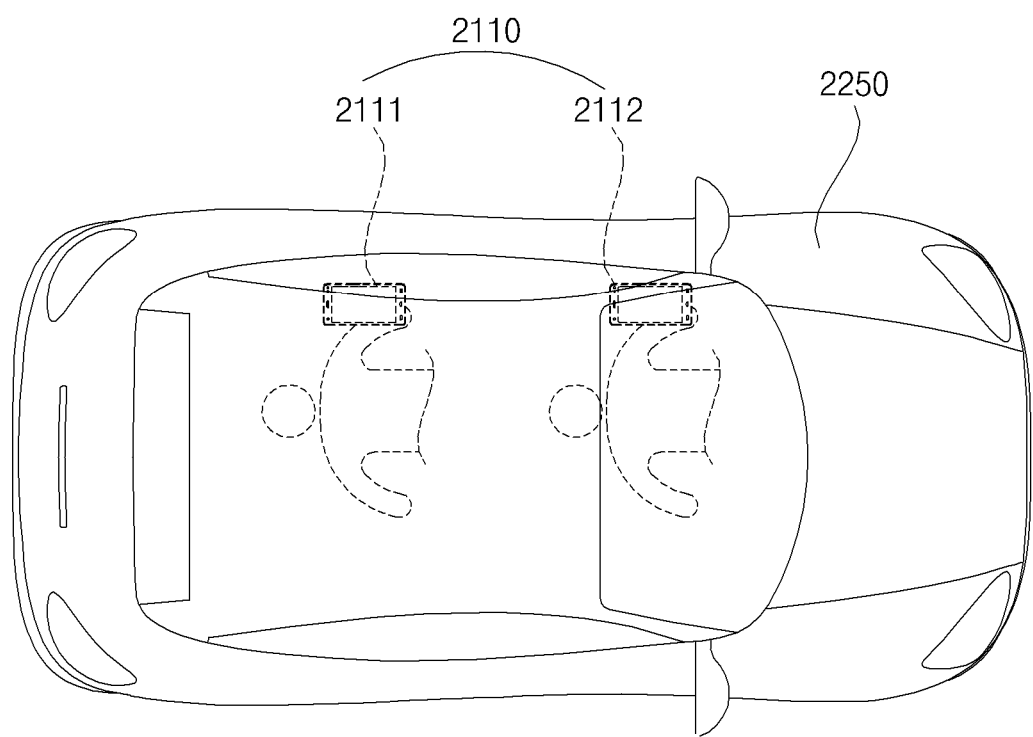

As illustrated in FIG. 22C, the classification step S1020 may include classifying one or more mobile terminals 1710 located inside another vehicle 2250 into a third group.

The processor 470 may determine whether the mobile terminals 2210 are located inside the other vehicle 2250 based on the location information about the one or more mobile terminals 2210.

The processor 470 may classify one or more mobile terminals 2210 located inside the other vehicle 2250 into a third group.

The filtering step S1030 may include excluding the third group from the information about objects.

The processor 470 may exclude the third group from the information about objects.

The method 800 for acquiring information about a pedestrian may further include switching the information about one or more mobile terminals 2110 included in the third group to information about another vehicle 2250.

The processor 470 may switch the information about the one or more mobile terminals 2110 included in the third group to the information about the other vehicle 2250.

The information about the one or more mobile terminals 2110 and the information about the other vehicle 2250 may be integrated and managed as information about one other vehicle 2250, thereby reducing the amount of information processing.

The method 800 for acquiring information about a pedestrian may further include determining whether a seventh mobile terminal 2111 included in the third group is moving outside the other vehicle 2250, and switching the information about the seventh mobile terminal to information about the mobile terminals.

The processor 470 may determine whether the seventh mobile terminal 2111 included in the third group is moving outside the other vehicle 2250, based on the location information about the seventh mobile terminal.

When it is determined that the seventh mobile terminal 2111 is moving outside the other vehicle 2250, the processor 470 may switch the information about the seventh mobile terminal 2111 from the information about the other vehicle 2250 to the information about the mobile terminals.

The processor 470 may include information about the seventh mobile terminal 2111 in the information about objects.

Figure 22D:
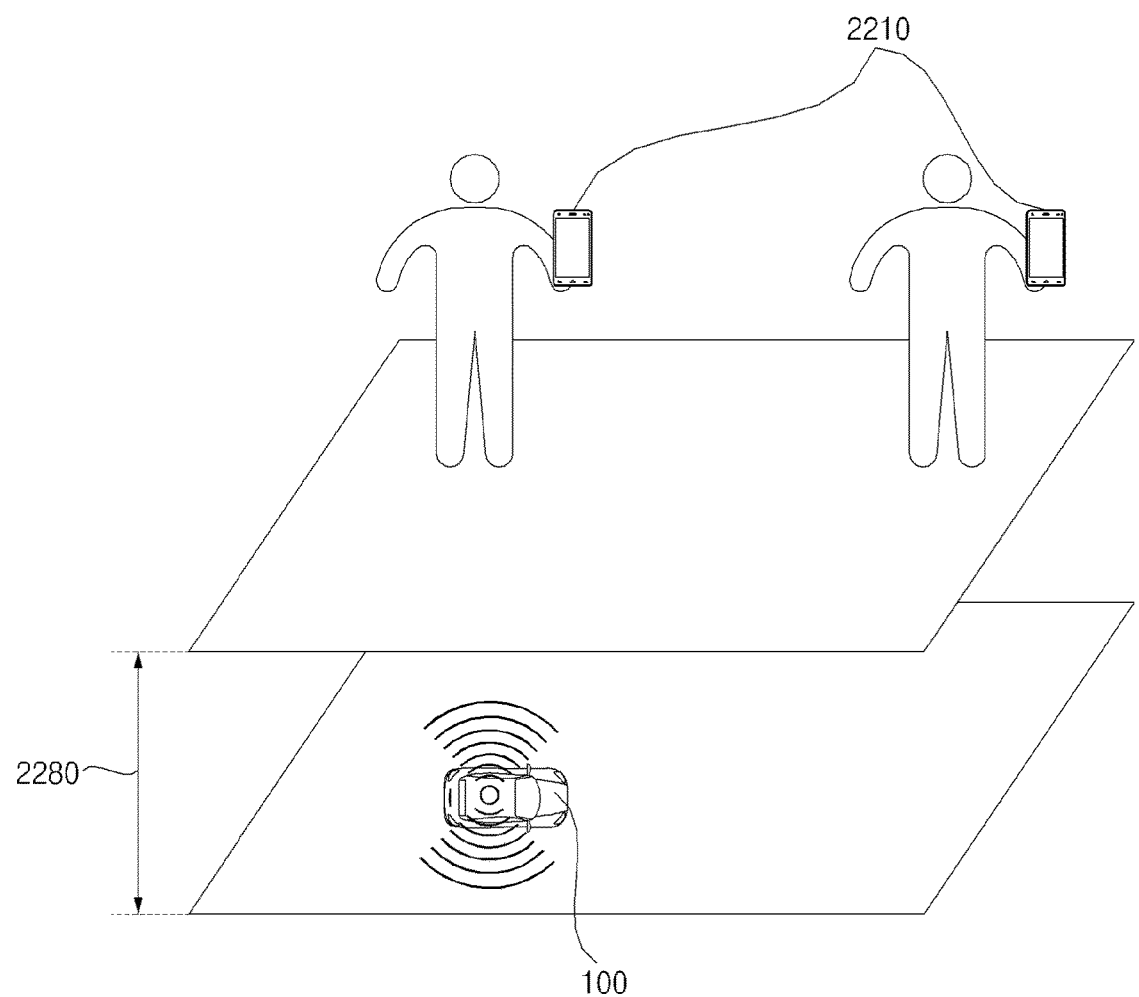

As illustrated in FIG. 22D, the classification step S1020 may include classifying one or more mobile terminals 2210 into a fourth group when a difference 2280 in altitude between the mobile terminals 2210 and the vehicle 100 is greater than or equal to a reference value.

The processor 470 may determine whether the difference in altitude between the vehicle 100 and the mobile terminals 2210 is greater than or equal to the reference value, based on the location information about the one or more terminals 2210.

The processor 470 may classify one or more mobile terminals 2210 into the fourth group when the difference in altitude between the mobile terminals 2210 and the vehicle 100 is greater than or equal to the reference value.

The filtering step S1030 may include excluding the fourth group from the information about objects.

The processor 470 may exclude the fourth group from the information about objects.

Figure 23:
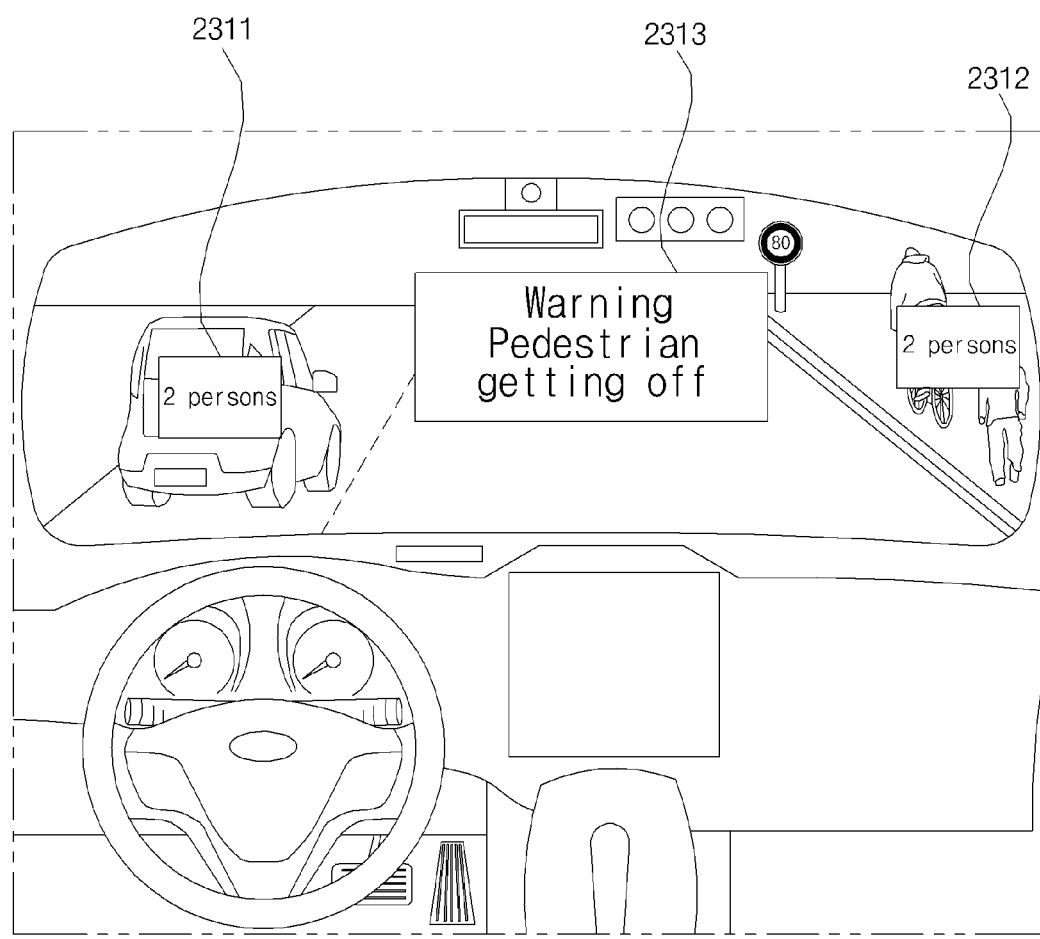
FIG. 23 is a diagram illustrating an example method to control displaying a graphical object.

FIG. 23 illustrates an example method to control displaying a graphical object.

Referring to FIG. 23, the method 800 for acquiring information about a pedestrian may further include controlling a graphical object corresponding to information about mobile terminals included in the information about objects to be displayed through the UI device 200 (S1040).

The processor 470 may control a graphical object corresponding to information about mobile terminals included in the information about objects to be displayed through the UI device 200.

The processor 470 may provide the UI device 200 with the information about the mobile terminals.

The UI device 200 may control graphical objects 2311 and 2312 corresponding to the mobile terminals included in the information about objects to be displayed based on the information about the mobile terminals.

The processor 470 may provide the information about a divided group to the UI device 200.

The UI device 200 may control the graphical objects 2311 and 2312 corresponding to the mobile terminals included in the information about objects to be displayed, based on the information about the divided group.

The UI device 200 may output a graphical object 2313 indicating a situation requiring the driver's attention, in relation to pedestrians.

The step S1040 of controlling the graphical objects to be displayed may include determining at least one of a shape, size, color or transparency of the graphical object, based on at least one of the information about the distances between the vehicle 100 and the mobile terminals or the information about the driving lane of the vehicle.

The processor 470 may determine at least one of a shape, size, color or transparency of the graphical object, based on at least one of the information about the distances between the vehicle 100 and the mobile terminals or the information about the driving lane of the vehicle.

For example, when the vehicle 100 is traveling on a roadway which is not adjacent to the sidewalk between two or more lanes, the processor 470 may control the graphical object to be displayed with a shape, size, color, and transparency different from those given when the vehicle 100 is traveling on a roadway close to the sidewalk to be displayed.

For example, when the vehicle 100 is traveling in a roadway on the same side as a sidewalk with respect to the center line, the processor 470 may perform a control operation such that the graphical object is displayed with a shape, size, color and transparency different from those given when the vehicle 100 travels on a roadway on the side opposite to the sidewalk.

As is apparent from the above description, According to implementations, one or more of the following effects may be obtained.

First, a traffic issue may be addressed by filtering only the information used for driving the vehicle.

Second, the time required for data processing may be reduced, and the cost of hardware required for data processing is lowered.

Third, data may be efficiently processed and managed.

Effects of the present application are not limited to the aforementioned effects, and other effects of the present application which are not mentioned above will become apparent to those having ordinary skill in the art from the claims.

The present application described above may be implemented as computer-readable code on a program-recorded medium. The computer-readable medium includes all kinds of recording devices in which data readable by a computer system can be stored. Examples of the computer-readable medium include a hard disk drive (HDD), solid state disk (SSD), silicon disk drive (SDD), ROM, RAM, CD-ROM, magnetic tape, floppy disk, and optical data storage. Alternatively, the application may be implemented in the form of a carrier wave (e.g., transmission over the Internet). In addition, the computer may include a processor or a controller. Although the preferred implementations of the present application have been disclosed for illustrative purposes, those skilled in the art will appreciate that various modifications, additions and substitutions are possible, without departing from the scope and spirit of the application as disclosed in the accompanying claims.

What is claimed is:

1. A method for acquiring information of a mobile terminal user, the method comprising:
  receiving, by a receiver, location information of a plurality of mobile terminals, the location information including a location of each of the plurality of mobile terminals;
  recognizing that at least a part of the location information corresponds to at least one person's location; and
  based on the location information, determining, by at least one processor, terminal information corresponding to at least one mobile terminal of the plurality of mobile terminals to be included in object information for travel of a vehicle,
  wherein the terminal information includes at least one of information representing presence or absence of the at least one mobile terminal, information representing a location of the at least one mobile terminal, information representing a distance between the vehicle and the at least one mobile terminal, and information representing a relative speed of the vehicle with respect to the at least one mobile terminal,
  wherein the location information comprises point information representing points at which the plurality of mobile terminals are respectively located, and change information representing changed points to which the plurality of mobile terminals are respectively moved from the points,
  wherein determining the terminal information to be included in the object information comprises:
    based on the point information, determining, by the at least one processor, whether a first mobile terminal of the plurality of mobile terminals is located in a first area of a sidewalk, the first area being spaced from a roadway by at least a reference distance,
    based on a determination that the first mobile terminal is located in the first area, determining, by the at least one processor, first terminal information corresponding to the first mobile terminal not to be included in the object information,
    based on the change information, determining, by the at least one processor, whether the first mobile terminal is being moved from the first area to a second area, the second area being within the reference distance from the roadway, and
    based on a determination that the first mobile terminal is being moved from the first area to the second area, determining, by the at least one processor, the first terminal information to be included in the object information.

2. The method according to claim 1, wherein determining, by the at least one processor, the terminal information to be included in the object information comprises:
  based on the point information, determining, by the at least one processor, whether a second mobile terminal of the plurality of mobile terminals is located inside a building, and
  based on a determination that the second mobile terminal is located in an interior area of the building, determining, by the at least one processor, second terminal information corresponding to the second mobile terminal not to be included in the object information.

3. The method according to claim 2, wherein determining, by the at least one processor, the terminal information to be included in the object information comprises:
  based on the change information, determining, by the at least one processor, whether the second mobile terminal is moved from the interior area of the building to an exterior area of the building; and
  based on a determination that the second mobile terminal is being moved from the interior area of the building to the exterior area of the building, determining, by the at least one processor, the second terminal information to be included in the object information.

4. The method according to claim 1, wherein determining, by the at least one processor, the terminal information to be included in the information related to objects comprises:
  based on the point information, determining, by the at least on processor, whether a third mobile terminal of the plurality of mobile terminals is located in an interior area of a first vehicle; and
  based on a determination that the third mobile terminal is located in the interior area of the first vehicle, determining, by the at least one processor, third terminal information corresponding to the third mobile terminal not to be included in the object information.

5. The method according to claim 4, wherein determining, by the at least one processor, the terminal information to be included in the object information comprises:
  based on the change information, determining, by the at least one processor, whether the third mobile terminal is being moved from the interior area of the first vehicle to an exterior area of the first vehicle, and
  based on a determination that the third mobile terminal is being moved from the interior area of the third mobile terminal to the exterior area of the first vehicle, determining, by the at least one processor, the third terminal information to be included in the object information.

6. The method according to claim 1, wherein determining, by the at least one processor, the terminal information to be included in the object information comprises:
  based on the point information, determining, by the at least one processor, whether a fourth mobile terminal of the plurality of mobile terminals is located in a rearward direction relative to the vehicle, and
  based on a determination that the fourth mobile terminal is located at the rearward direction relative to the vehicle, determining, by the at least one processor, fourth terminal information corresponding to the fourth mobile terminal not to be included in the object information.

7. The method according to claim 1, wherein determining, by the at least one processor, the terminal information to be included in the object information comprises:
  based on the point information, determining, by the at least one processor, whether a fifth mobile terminal of the plurality of mobile terminals is located in a caution area, and
  based on a determination that the fifth mobile terminal is located in the caution area, determining, by the at least one processor, fifth terminal information corresponding to the fifth mobile terminal to be included in the object information, and
  wherein the caution area comprises a bus stop area, a parking area, and an area in which more than a reference number of mobile terminals of the plurality of mobile terminals are located.

8. The method according to claim 1, wherein the location information comprises:
  altitude information for each of the plurality of mobile terminals,
  wherein determining, by the at least one processor, the terminal information to be included in the object information comprises:

based on the altitude information for a sixth mobile terminal of the plurality of mobile terminals, determining, by the at least one processor, whether a difference of altitude between the sixth mobile terminal and the vehicle satisfies a reference value, and based on a determination that the difference of altitude between the sixth mobile terminal and the vehicle satisfies the reference value, determining, by the at least one processor, sixth terminal information corresponding to the sixth mobile terminal not to be included in the object information.

9. The method according to claim 1, further comprising: controlling, by the at least one processor through a user interface device, to display a graphical object corresponding to the terminal information that is determined to be included in the object information.

10. The method according to claim 9, wherein controlling to display the graphical object comprises:
based on at least one of (i) the distance between the vehicle and the at least one mobile terminal or (ii) driving lane information, determining, by the at least one processor, at least one of a shape, a size, a color, or transparency of the graphical object.

11. The method according to claim 1, further comprising: based on recognizing that at least the part of the location information corresponds to the at least one person's location, excluding at least the part of the location information from the object information.

12. The method according to claim 11, wherein recognizing that at least the part of the location information corresponds to the at least one person's location comprises:
recognizing that at least the part of the location information corresponds to the at least one person's location based on the determination that the first mobile terminal is located in the first area.

13. A method for acquiring information of a mobile terminal user, the method comprising:
receiving, by a receiver, location information of a plurality of mobile terminals, the location information including a location of each of the plurality of mobile terminals;
recognizing that at least a part of the location information corresponds to at least one person's location;
based on the location information, determining, by at least one processor, terminal information corresponding to at least one mobile terminal of the plurality of mobile terminals to be included in object information for travel of a vehicle; and
based on the location information, classifying, by the at least one processor, the plurality of mobile terminals into one or more groups,
wherein determining the terminal information to be included in the object information comprises:
based on the one or more groups, determining the terminal information corresponding to the one mobile terminal of the plurality of mobile terminals to be included in the object information,
wherein classifying, by the at least one processor, the plurality of mobile terminals into the one or more groups comprises:
based on the location information, determining, by the at least one processor, whether a first mobile terminal of the plurality of mobile terminals is located in an interior area of a building, and
based on a determination that the first mobile terminal is located in the interior area of the building, classifying, by the at least one processor, the first mobile terminal into a first group of the one or more groups, and
wherein determining the terminal information to be included in the object information comprises:
determining, by the at least one processor, first terminal information corresponding to the first mobile terminal included in the first group not to be included in the object information.

14. The method according to claim 13, wherein classifying, by the at least one processor, the plurality of mobile terminals into the one or more groups comprises:
based on the location information, determining, by the at least one processor, whether a second mobile terminal of the plurality of mobile terminals is located in a first area of a sidewalk, the first area being spaced from a roadway by at least a reference distance, and
based on a determination that the second mobile terminal is located in the first area of the sidewalk, classifying, by the at least one processor, the second mobile terminal into a second group of the one or more groups,
wherein determining the terminal information to be included in the object information comprises:
determining, by the at least one processor, second terminal information corresponding to the second mobile terminal included in the second group not to be included in the object information.

15. The method according to claim 13, wherein classifying, by the at least one processor, the plurality of mobile terminals into the one or more groups comprises:
based on the location information, determining, by the at least one processor, whether a third mobile terminal of the plurality of mobile terminals is located in an interior area of a second vehicle that is different from the vehicle,
based on a determination that the third mobile terminal is located in the interior area of the second vehicle, classifying, by the at least one processor, the third mobile terminal into a third group of the one or more groups, and
wherein determining the terminal information to be included in the object information comprises:
determining, by the at least one processor, third terminal information corresponding to the third mobile terminal included in the third group not to be included in the object information.

16. The method according to claim 15, further comprising:
based on a determination that the third mobile terminal is located in the interior area of the second vehicle, determining, by the at least one processor, the third terminal information to be included in vehicle information corresponding to the second vehicle.

17. The method according to claim 16, further comprising:
based on the location information, determining, by the at least one processor, whether the third mobile terminal in the third group is being moved from the interior area of the second vehicle to an exterior area of the second vehicle; and
based on a determination that the third mobile terminal in the third group is being moved from the interior area of the second vehicle to the exterior area of the second vehicle, removing the third terminal information from the vehicle information corresponding to the second vehicle.

18. The method according to claim 13, classifying, by the at least one processor, the plurality of mobile terminals into the one or more groups comprises:
- based on the location information, determining, by the at least one processor, whether a difference between an altitude at which a fourth mobile terminal of the plurality of mobile terminals is located and an altitude at which the vehicle is located satisfies a reference value, and
- based on a determination that the difference satisfies the reference value, classifying, by the at least one processor, the fourth mobile terminal into a fourth group,
- wherein determining the terminal information to be included in the object information comprises:
  - determining, by the at least one processor, fourth terminal information corresponding to the fourth mobile terminal included in the fourth group not to be included in the object information.

* * * * *